(12) United States Patent
Lin et al.

(10) Patent No.: US 8,000,041 B1
(45) Date of Patent: Aug. 16, 2011

(54) LENS MODULES AND FABRICATION METHODS THEREOF

(75) Inventors: Chien-Pang Lin, Hsinchu County (TW); San-Yuan Chung, Hsinchu (TW); Weng-Chu Chu, Hsinchu County (TW)

(73) Assignees: VisEra Technologies Company Limited, Hsinchu Science Park (TW); OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 12/886,129

(22) Filed: Sep. 20, 2010

(51) Int. Cl.
*G02B 7/02* (2006.01)
*G02B 27/10* (2006.01)

(52) U.S. Cl. ........................................ 359/811; 359/619

(58) Field of Classification Search .................. 359/619, 359/694–701, 811–824, 826, 829
See application file for complete search history.

(56) References Cited

U.S. PATENT DOCUMENTS

| | | | |
|---|---|---|---|
| 7,796,336 B2 * | 9/2010 | Louh | 359/619 |
| 2010/0013113 A1 * | 1/2010 | Chang | 264/1.7 |
| 2010/0270691 A1 * | 10/2010 | Chuang | 264/1.36 |

* cited by examiner

*Primary Examiner* — Mohammed Hasan
(74) *Attorney, Agent, or Firm* — Muncy, Geissler, Olds & Lowe, PLLC

(57) ABSTRACT

According to an embodiment of the present invention, a lens module is provided, which includes a first lens assembly including a first patterned substrate, a first recess formed from a first surface of the first patterned substrate, a first lens element disposed in the first recess, and a second lens element disposed on the first patterned substrate, wherein the second lens element aligns along an optical axis through the first lens element.

20 Claims, 28 Drawing Sheets

LENS MODULES AND FABRICATION METHODS THEREOF

BACKGROUND OF THE INVENTION

1. Field of the Invention

The invention relates to lens modules and more particularly to lens modules with a patterned substrate and fabrication methods thereof.

2. Description of the Related Art

Micro-optical components such as one- and two-dimensional lens assemblies are typically used in devices such as lens modules. The design and manufacturing of lens modules for portable electronic products is extremely challenging. Some challenging factors include: high production volume, constant price erosion, size limitations and changing performance and functionality requirements.

FIG. 1 is a schematic view illustrating a configuration of a conventional imaging lens module. Referring to FIG. 1, a conventional imaging lens module 10 includes a first plano-plano substrate 12 with a first lens 14 and a second lens 16 formed on both sides of the substrate 12, a second plano-plano substrate 22 with a third lens 24 and a fourth lens 26 formed on both sides of the substrate 22, and a spacer 36 interposed between the first and the second substrates 12 and 22. A black yard coating layer 18 can be formed on the second lens 16 to serve as an aperture. An antireflection film 28 can be formed on the fourth lens 26. The spacer 36 can separate the first and the second substrates 12 and 22 by a predetermined gap. Additionally, spacers 34 and 38 are, respectively formed on the front surface of the first substrate 12 and the back surface of the second substrate 22. Stacking glues 32 are used between the spacers 34, 36 and 38 and the first and second substrates 12 and 22.

Conventionally, packaging techniques are used when stacking and aligning the imaging lens module 10. There are some problems associated with the conventional packaged lens module, such as high spacer production costs, limitations of the substrate used therein and inaccurate spacer thicknesses and alignment of the optical center of the lens module due to spacer processes which cause misalignment.

BRIEF SUMMARY OF THE INVENTION

According to an embodiment of the present invention, a lens module is provided, which includes a first lens assembly including a first patterned substrate, a first recess formed from a first surface of the first patterned substrate, a first lens element disposed in the first recess, and a second lens element disposed on the first patterned substrate, wherein the second lens element aligns along an optical axis through the first lens element.

According to an embodiment of the present invention, a method for fabricating a lens module is provided, which includes forming a first lens assembly, the forming of the first lens assembly including providing a first substrate having a first surface and a second surface, removing a portion of the first substrate from the first surface of the first substrate to form a first recess, disposing a first lens element in the first recess, and disposing a second lens element on the first substrate, wherein the second lens element aligns along an optical axis through the first lens element.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As key features and main aspects of the invention, embodiments of the invention provide a patterned substrate with an array of openings or recesses in which lens elements can be formed or disposed. Two patterned substrates can be aligned and stacked, and then diced into lens modules. The lens module includes a first patterned substrate having at least a first recess. The bottom of the first recess may include a substantially flat central region which is surrounded by raised sidewalls of the first recess of the first patterned substrate. A first lens element may be disposed on a front surface of the substantially flat central region, and a second lens element may be disposed on a back surface of the substantially flat central region. Replication of lens structures may be achieved by molding. The lens may be made of materials with UV curable polymer compounds. A coating layer may be optionally or alternatively disposed on the first lens element or the second lens element.

Figure 1:
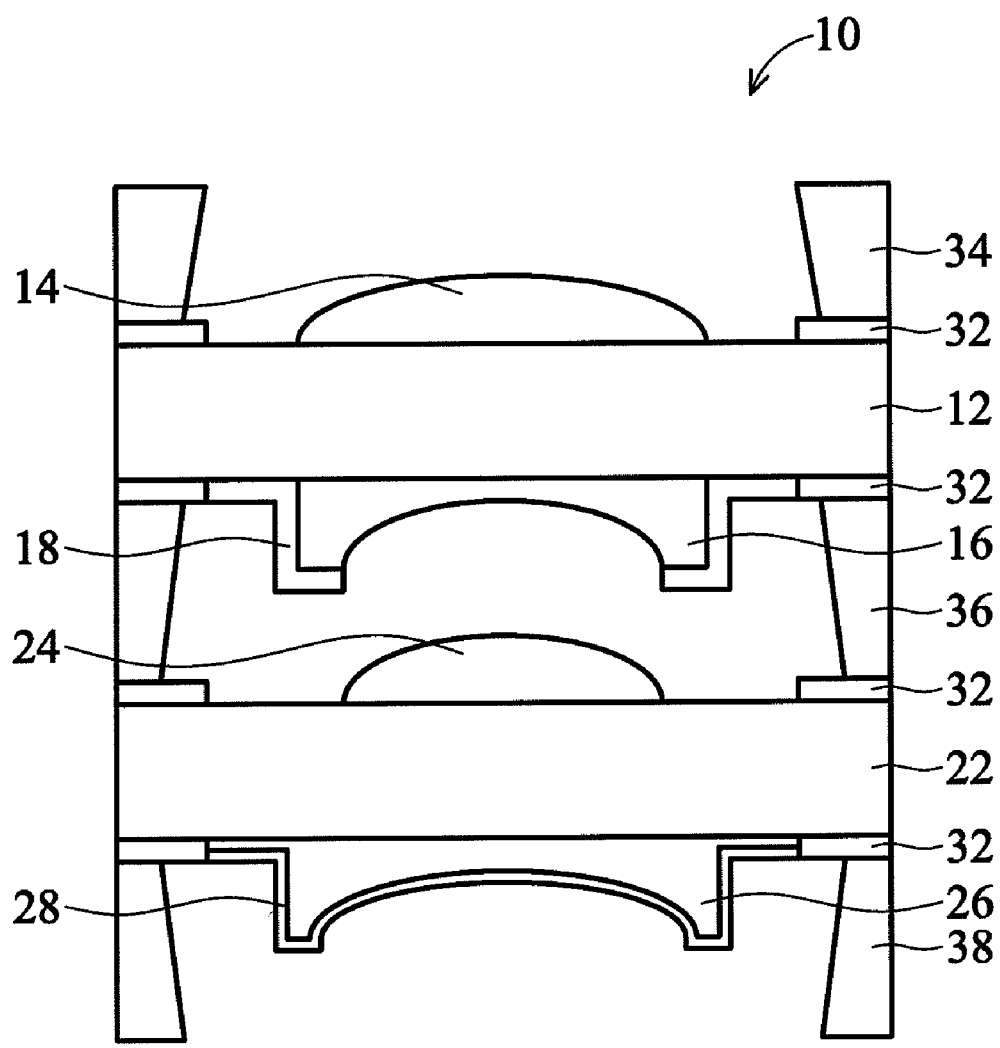
FIG. 1 is a schematic view illustrating a configuration of a conventional imaging lens module.
Figure 2A:
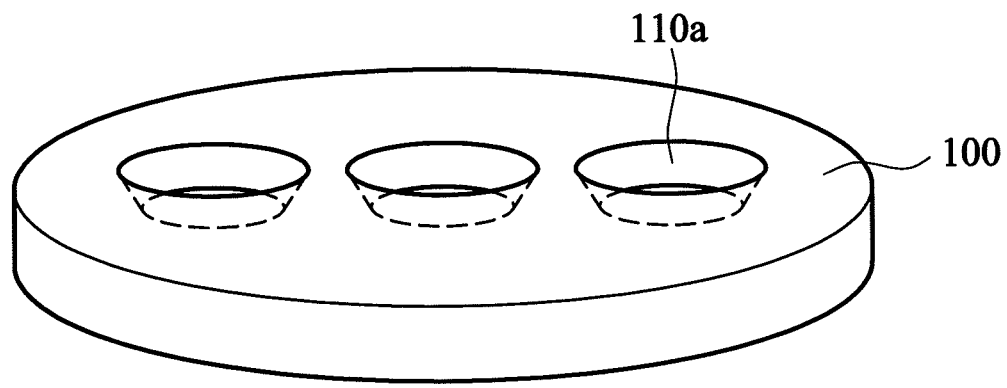
FIGS. 2A-2D are schematic views illustrating the processing of a substrate according to embodiments of the invention.
Figure 2B:
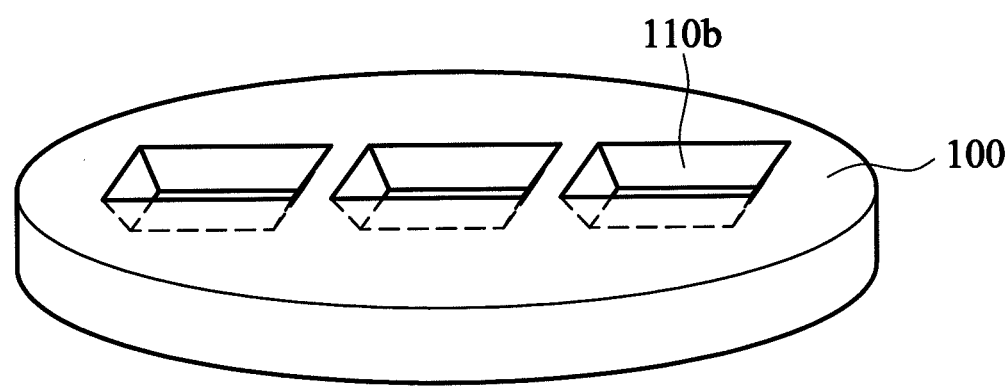
Figure 2C:
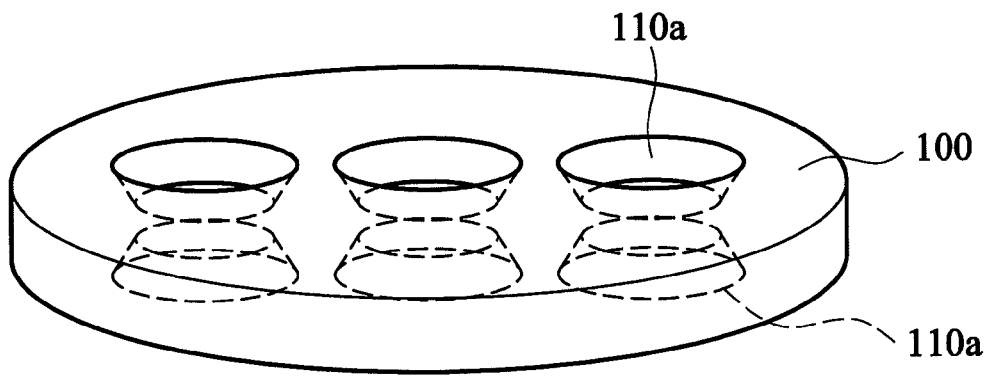
Figure 2D:
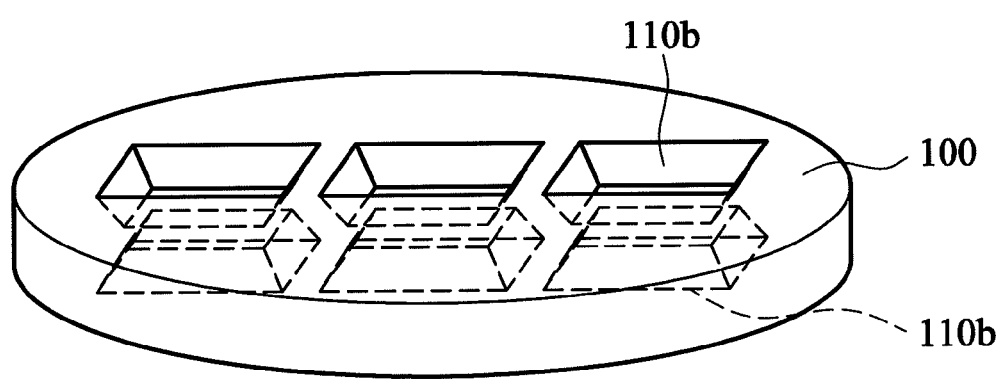
Figure 3A:
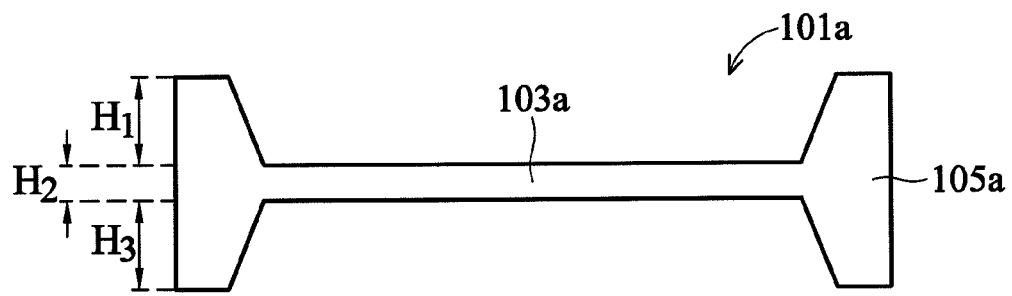
FIGS. 3A-3C are cross-sectional views showing various patterned substrates according to embodiments of the invention.
Figure 3B:
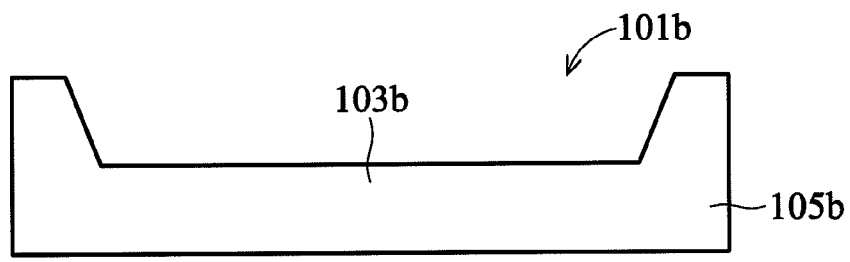
Figure 3C:
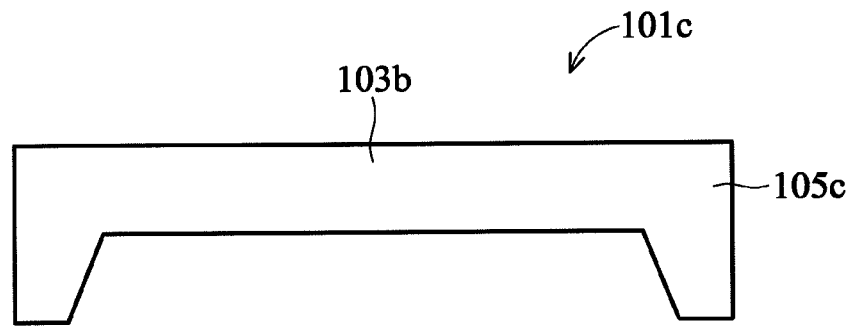

FIGS. 2A and 2B are schematic views illustrating the processing of a substrate according to embodiments of the invention. Referring to FIGS. 2A and 2B, a substrate 100 is provided. The substrate 100 may be a glass, a fused silica, a quartz, or a $CaF_2$ substrate, or other optical grade transparent substrate. The substrate 100 is partially removed by, for example etching to create an array of patterned openings 110a or 110b, such as trenches, recesses, or grooves comprising a substantially flat bottom region surrounded by raised sidewalls of the openings. The shapes of the cross-sections of the openings may be circular, rectangular, hexagonal, octagonal, or other suitable geographic shapes. The substrate 100 may also be double-sided partially removed such as those shown in FIGS. 2C and 2D. FIGS. 3A-3C are cross-sectional views showing various patterned substrates according to embodiments of the invention. In FIG. 3A, a patterned substrate 101a may be formed with at least a first recess and at least a second recess. The combination of the first and the second recesses can be a double-sided recess which includes double-sided raised walls 105a surrounding a substantially flat central region 103a. Thicknesses $H_1$, $H_3$ of the double-sided raised walls and thickness $H_2$ of the substantially flat central region are less than 300 μm, respectively. The total thickness ($H_1$, $H_2$, and $H_3$) of the double-sided raised walls and the substantially flat central region may be less than 300 μm. In FIG. 3B, a patterned substrate 101b may be formed with a single-sided recess (also referred as a first recess) formed from a top surface (or a first side) of the substrate 101b. The single-sided recess includes upward raised walls 105b surrounding a substantially flat central region 103b. Thicknesses of the upward raised walls and the substantially flat central region are less than 300 μm, respectively. The total thickness of the upward raised walls and the substantially flat central region may be less than 300 μm. In FIG. 3C, a patterned substrate 101c may be formed with a single-sided recess formed from a lower surface (or a second surface) of the patterned substrate 101c. The single-sided recess includes upward raised walls 105c surrounding a substantially flat central region 103b. Alternatively or optionally, coating layers (not shown) such as Cr coating, IR coating, AR coating, and PR coating layers may be deposited on one side or both sides of the patterned substrate. Deposition of the coating layers may be performed by sputtering or thermal evaporation processes.

Figure 4A:
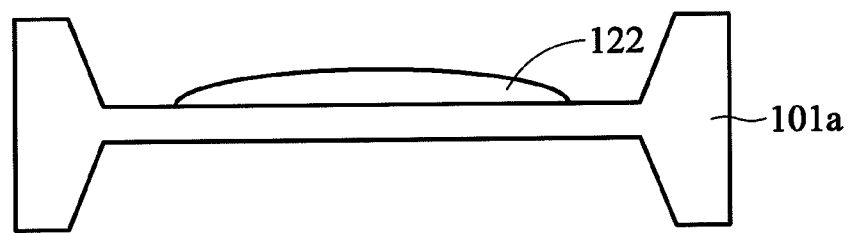
FIGS. 4A-4F are cross-sectional views showing of the step of lens replication on the patterned substrate according to embodiments of the invention.
Figure 4B:
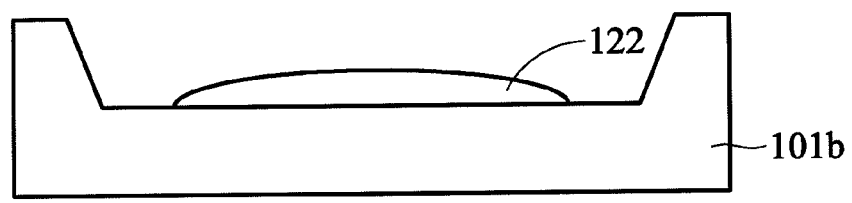
Figure 4C:
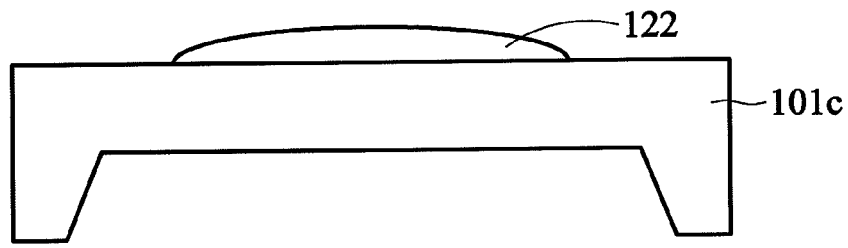
Figure 4D:
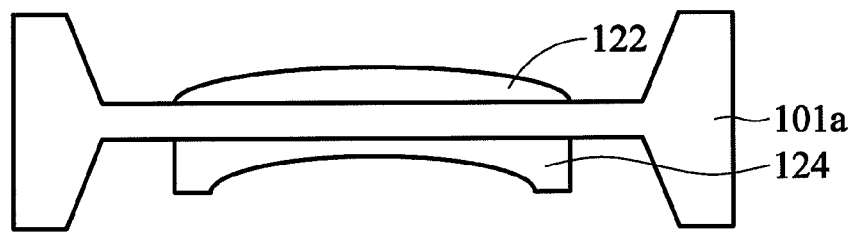
Figure 4E:
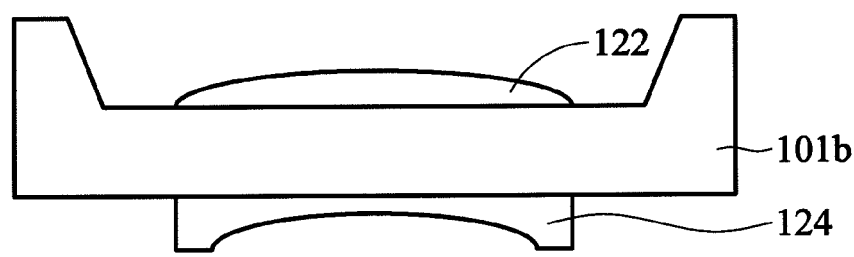
Figure 4F:
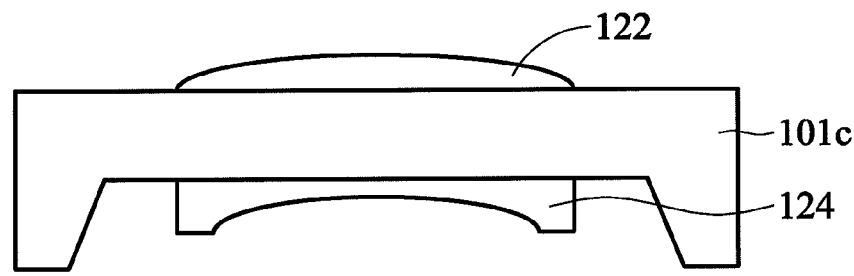

FIGS. 4A-4F are cross-sectional views showing of the step of lens replication on the patterned substrate according to embodiments of the invention. In the embodiments of FIGS. 4A-4C, a first lens element 122 may be formed on a first surface of the substantially flat bottom region of the patterned substrates 101a, 101b, and 101c, respectively. In the embodiments of FIGS. 4D-4F, a second lens element 124 may be optionally formed on a second surface of the substantially flat bottom region of the patterned substrates 101a, 101b, and 101c, respectively. The first lens element 122 may be a convex lens disposed on the first surface of the flat central region, and the second lens element 124 may be a concave lens disposed on a second surface of the flat central region. In one embodiment, the second lens element 124 aligns along an optical axis through the first lens element 122. The first and second lens elements may be formed by lens replication technologies, in particular, UV-embossing of polymer-on-glass lenses may be used for manufacturing stacked lens modules. Coating layers such as a black yard coating layer or an antireflection layer may be alternatively or optionally formed on the first lens element or the second lens element.

Figure 5:
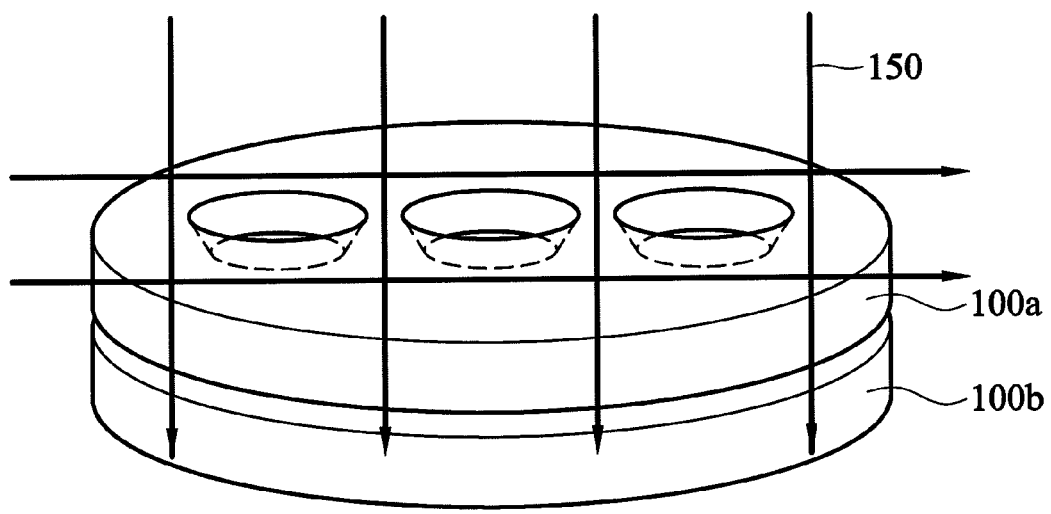
FIG. 5 shows an embodiment in which two patterned substrates are stacked, and are then diced into a plurality of individual lens modules.

FIG. 5 shows an embodiment in which two patterned substrates are stacked, and are then diced into a plurality of individual lens modules. A second substrate 100b with an array of second lens assemblies formed therein or thereon is provided. Each of the second lens assemblies corresponds to one of the first lens assemblies of the substrate 100a. The second substrate 100b is aligned and stacked with the first substrate 100a. An adhesion layer may be applied between the second lens assembly and the first lens assembly. Dicing of the stacked substrates may be performed to separate the stacked substrates into a plurality of individual lens modules.

Figure 6:
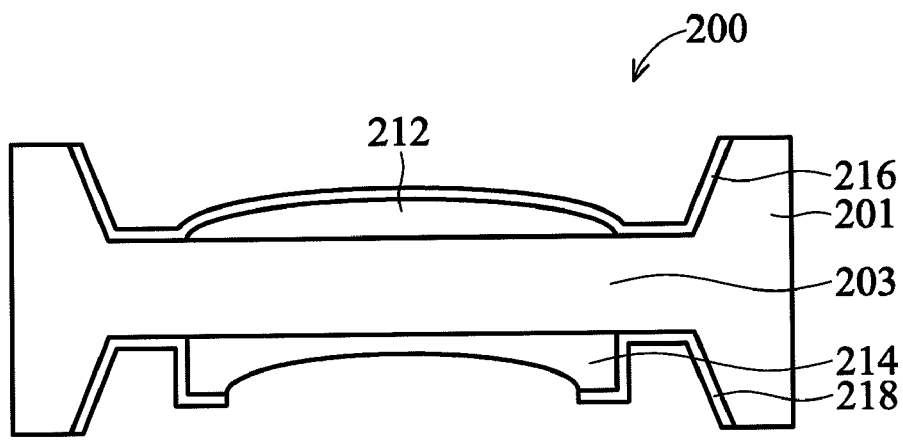
FIG. 6 is a cross-section view showing a lens assembly according to an embodiment of the invention.

Accordingly, a lens assembly or a stacked lens module can thus be provided. FIG. 6 is a cross-section view showing a lens assembly according to an embodiment of the invention. In FIG. 6, a lens assembly 200 includes a patterned substrate with a double-sided recesses. The recesses include double-sided raised walls 201 surrounding a substantially flat central region 203. A convex lens element 212 may be disposed on a first surface of the substantially flat central region 203. A concave lens element 214 may be disposed on a second surface of the substantially flat central region 203. In other words, the lens element 214 may be disposed in the recess formed from a lower surface of the substrate. An antireflection (AR) layer 216 may be disposed on the convex lens element 212. A black yard coating layer 218 may be disposed on the concave lens element 214 to serve as an aperture of the lens assembly 200.

Figure 7:
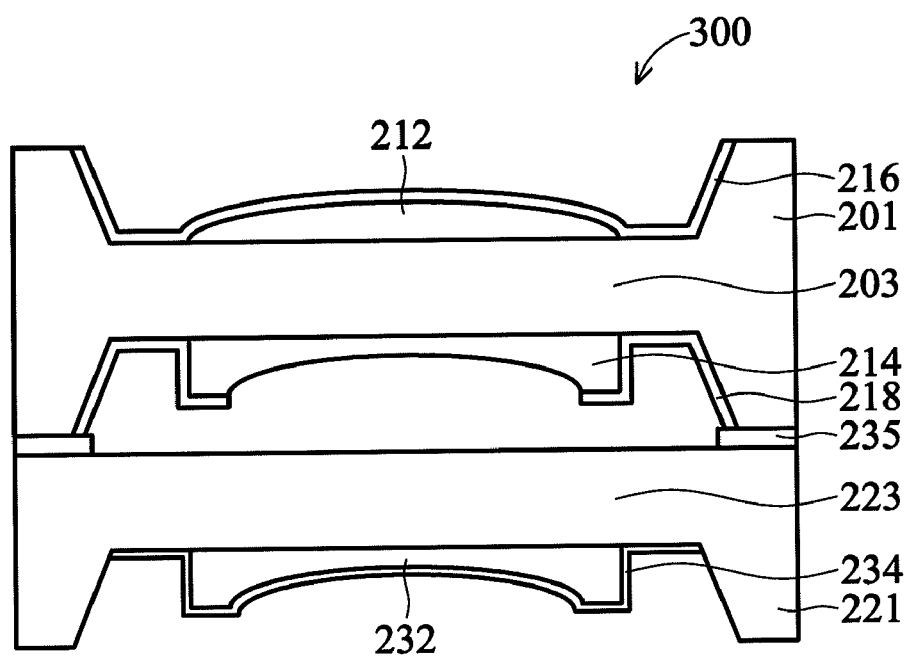
FIG. 7 is a cross-sectional view showing a stacked lens module according to an embodiment of the invention.

FIG. 7 is a cross-sectional view showing a stacked lens module according to an embodiment of the invention. In FIG. 7, a stacked lens module 300 includes a second lens assembly which is aligned with and stacked underlying the first lens assembly 200 of FIG. 6. The second lens assembly comprises a patterned substrate with downward raised walls 221 surrounding a substantially flat central region 223. A concave lens element 232 may be disposed on a second surface of the substantially flat central region 223. An antireflection (AR) layer 234 may be optionally or alternatively disposed on the concave lens element 232. An adhesion layer 235 may be interposed between the second lens assembly and the first lens assembly. In one embodiment, the lens elements 212, 214, and 232 align along an optical axis through the lens element 212.

Figure 8A:
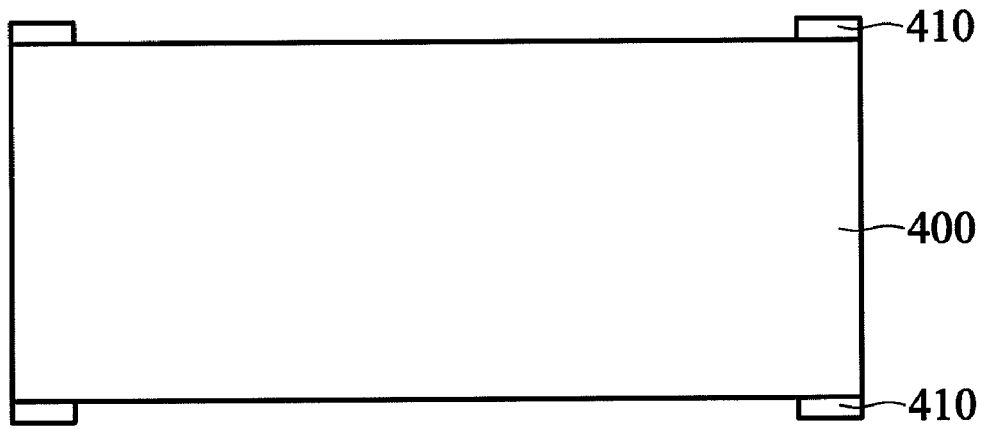
FIGS. 8A-8D are cross-sectional views illustrating the fabrication steps of a lens assembly according to an embodiment of the invention.
Figure 8B:
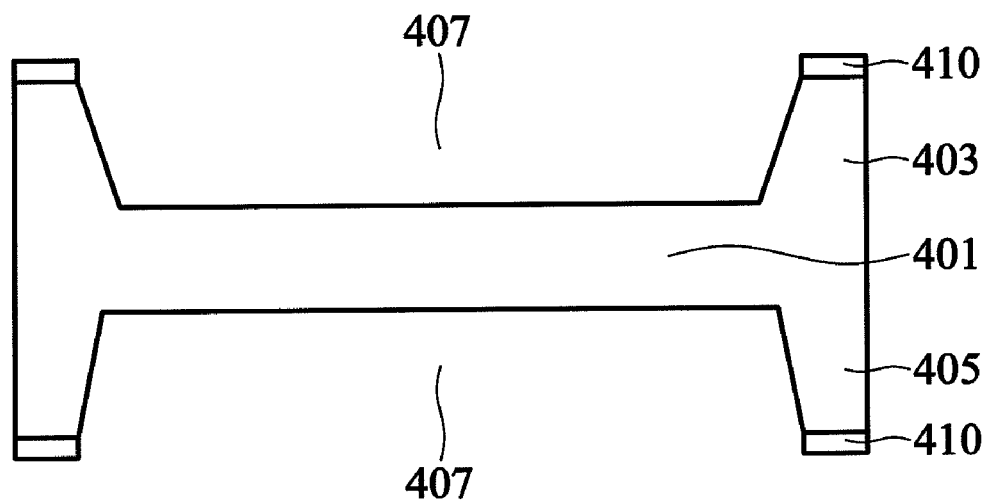

FIGS. 8A-8D are cross-sectional views illustrating the fabrication steps of a lens assembly according to an embodiment of the invention. Referring to FIG. 8A, a substrate 400 such as a bare glass substrate or a glass wafer is provided. A patterned photoresist layer 410 is formed on both sides of the substrate 400 exposing the surface of the substrate 400 to be partially removed. A suitable removing process such as a wet etching, dry etching or other physical treatment process is performed to create openings 407 (or recesses 407) on both sides of the substrate 400, as shown in FIG. 8B.

Figure 8C:
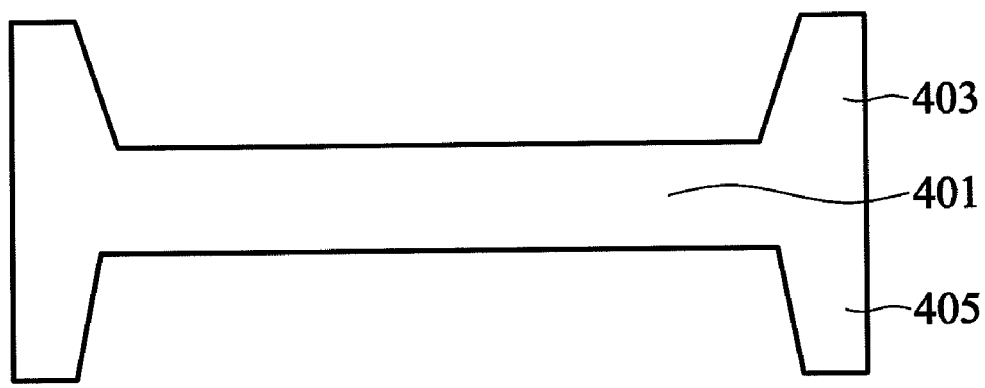
Figure 8D:
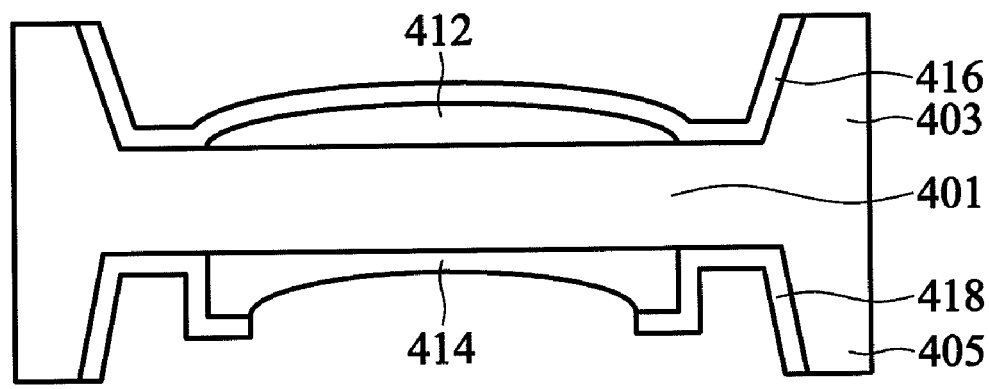

Referring to FIG. 8C, the patterned photoresist layer 410 is subsequently removed from the substrate, leaving a patterned substrate comprising a double-sided recesses. The substrate includes double-sided raised walls 403 and 405 surrounding a substantially flat central region 401. A convex lens element 412 may be disposed on a first surface of the substantially flat central region 401. A concave lens element 414 may be disposed on a second surface of the substantially flat central region 401. In other words, the lens element 412 may be disposed in the recess formed from an upper surface of the patterned substrate, and the lens element 414 may be disposed in the recess formed from a lower surface of the patterned substrate. An antireflection (AR) layer 416 may be disposed on the convex lens element 412. A black yard coating layer 418 may be disposed on the concave lens element 414, as shown in FIG. 8D. An additional dicing process may be performed to separate the substrate into a plurality of individual lens assemblies. In one embodiment, the lens elements 412 and 414 align along an optical axis through the lens element 412.

Figure 9A:
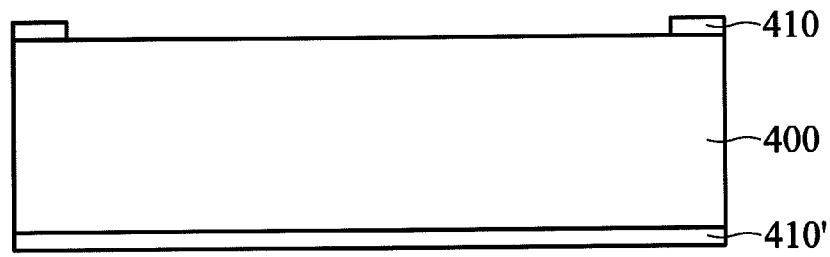
FIGS. 9A-9E are cross-sectional views illustrating the fabrication steps of a lens assembly according to another embodiment of the invention.
Figure 9B:
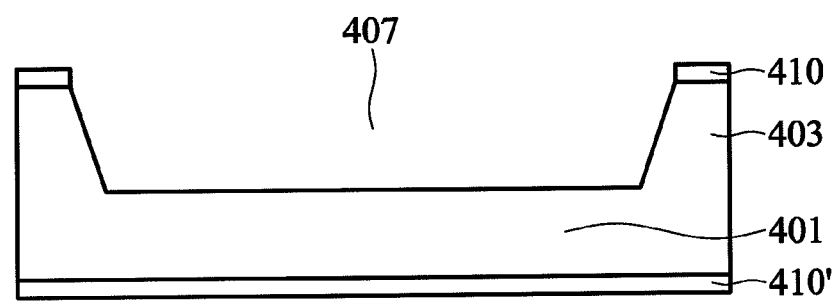

FIGS. 9A-9E are cross-sectional views illustrating the fabrication steps of a lens assembly according to another embodiment of the invention. Referring to FIG. 9A, a substrate 400 such as a bare glass substrate is provided. A patterned photoresist layer 410 is formed on the front surface (or the first surface) of the substrate 400 exposing the surface of the substrate 400 to be partially removed. Another photoresist layer 410' is formed on the back surface (or the second surface) of the substrate 400. A suitable removing process such as a wet etching, dry etching or other physical treatment process is performed to create openings 407 (or recesses) on the front surface of the substrate 400, as shown in FIG. 9B.

Figure 9C:
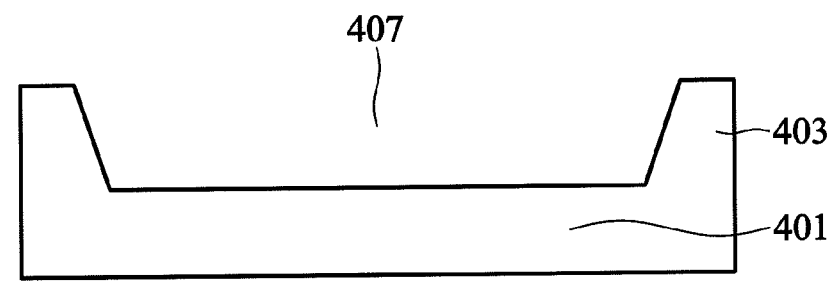
Figure 9D:
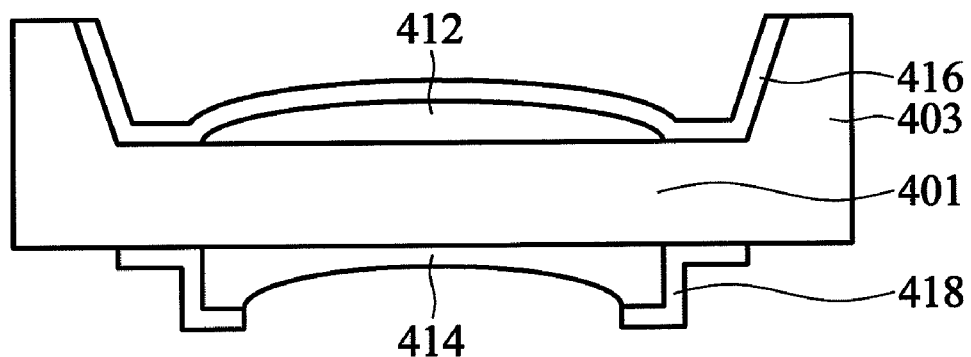
Figure 9E:
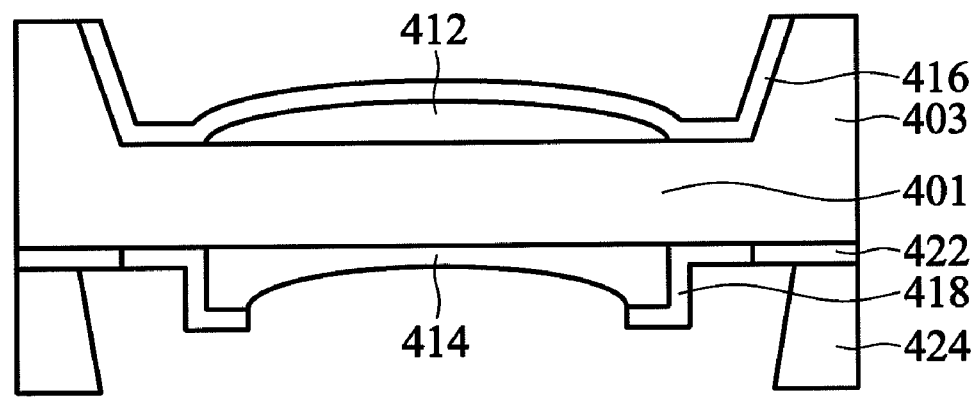

Referring to FIG. 9C, the photoresist layers 410 and 410' are subsequently removed from the substrate, leaving a patterned substrate comprising a single-sided recess formed from the front surface (first side) toward the back surface (second side) of the patterned substrate. The recess includes upward raised walls 403 surrounding a substantially flat central region 401. A convex lens element 412 may be disposed on a first surface of the substantially flat central region 401. In other words, the convex lens element 412 may be disposed in the recess formed from the front surface. A concave lens element 414 may be disposed on a second surface of the substantially flat central region 401. An antireflection (AR) layer 416 may be disposed on the convex lens element 412. A black yard coating layer 418 may be disposed on the concave lens element 414, as shown in FIG. 9D. A spacer 424 may be disposed on the back surface of the patterned substrate and surrounding the concave lens element 414, wherein an adhesion layer 422 may be used between the spacer 424 and the back surface of the patterned substrate, as shown in FIG. 9E. An additional dicing process may be performed to separate the substrate into a plurality of individual lens assemblies. In one embodiment, the lens elements 412 and 414 align along an optical axis through the lens element 412.

Figure 10A:
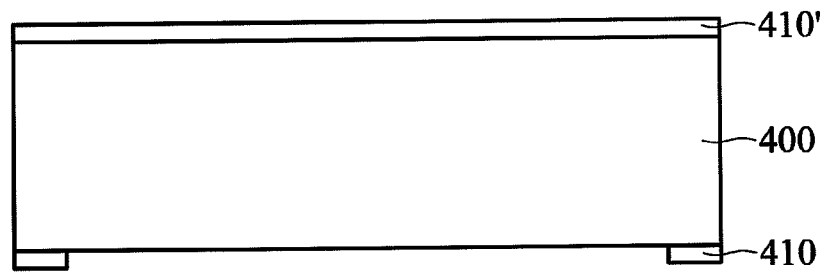
FIGS. 10A-10E are cross-sectional views illustrating the fabrication steps of a lens assembly according to yet another embodiment of the invention.
Figure 10B:
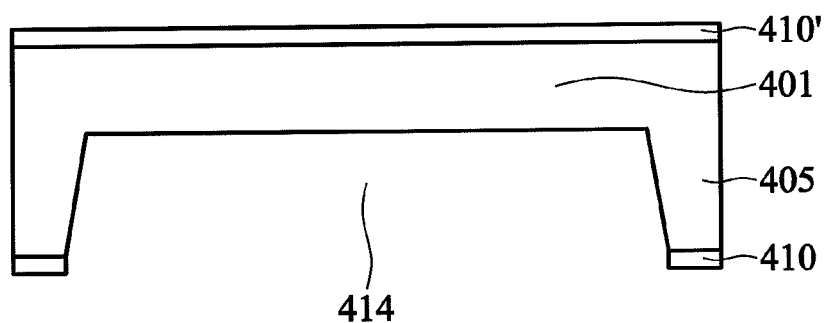

FIGS. 10A-10E are cross-sectional views illustrating the fabrication steps of a lens assembly according to yet another embodiment of the invention. Referring to FIG. 10A, a substrate 400 such as a bare glass substrate is provided. A patterned photoresist layer 410 is formed on the back surface (or second surface) of the substrate 400 exposing the surface of the substrate 400 to be partially removed. Another photoresist layer 410' is formed on the front surface (or first surface) of the substrate. A suitable removing process such as a wet etching, dry etching or other physical treatment process is performed to create openings 407 (or recesses) on the back surface of the substrate 400, as shown in FIG. 10B.

Figure 10C:
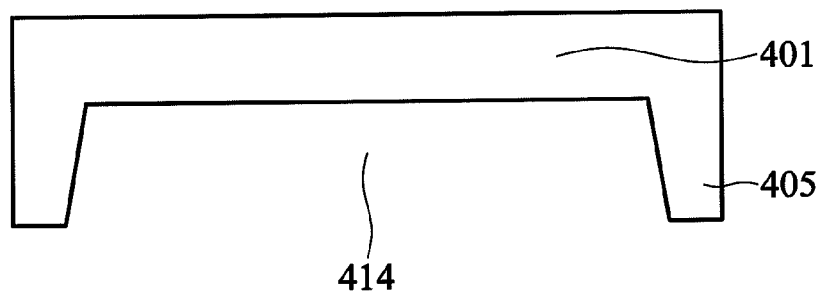
Figure 10D:
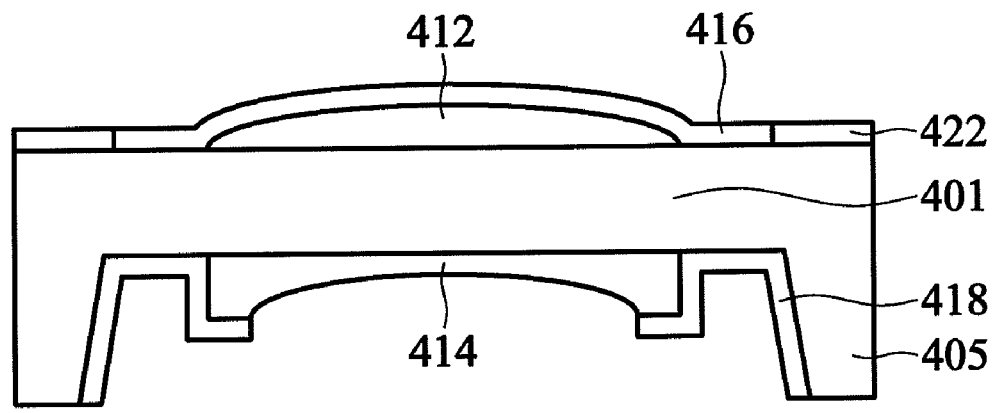
Figure 10E:
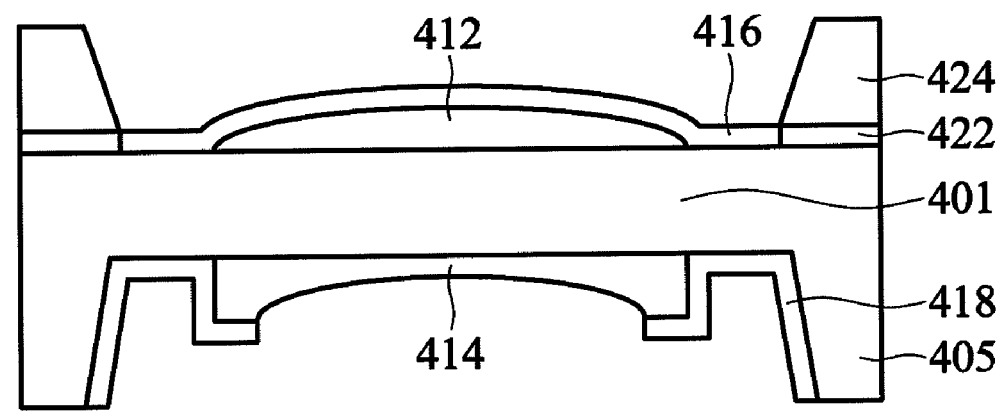

Referring to FIG. 10C, the photoresist layers 410 and 410' are subsequently removed from the substrate, leaving a patterned substrate comprising a single-sided recess formed from the back surface of the patterned substrate which includes downward raised walls 405 surrounding a substantially flat central region 401. A convex lens element 412 may be disposed on a first surface of the substantially flat central region 401. A concave lens element 414 may be disposed on a second surface of the substantially flat central region 401. In other words, the lens element 412 may be disposed on the front surface of the patterned substrate, and the lens element 414 may be disposed in the recess formed from the back surface of the patterned substrate. An antireflection (AR) layer 416 may be disposed on the convex lens element 412. A black yard coating layer 418 may be disposed on the concave lens element 414, as shown in FIG. 10D. A spacer 424 may be disposed on the front surface of the patterned substrate and surrounding the convex lens element 412, wherein an adhesion layer 422 may be used between the spacer 424 and the front surface of the patterned substrate, as shown in FIG. 10E. An additional dicing process may be performed to separate the substrate into a plurality of individual lens assemblies. In one embodiment, the lens elements 412 and 414 align along an optical axis through the lens element 412.

Figure 11A:
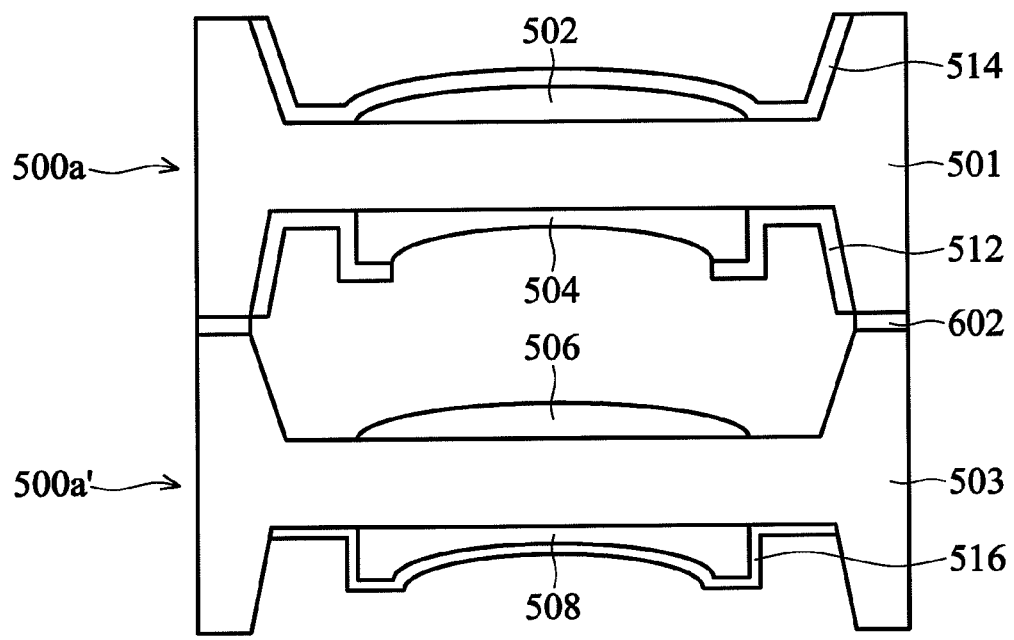
FIGS. 11A-11AA are cross-sectional views showing stacked lens modules according to various embodiments of the invention.

FIGS. 11A-11AA are cross-sectional views showing stacked lens modules according to various embodiments of the invention. In FIG. 11A, a second lens assembly 500a' is aligned with and stacked underlying a first lens assembly 500a, wherein an adhesion layer 602 is interposed between the first lens assembly 500a and the second lens assembly 500a'. In one embodiment, the first lens assembly 500a includes a first patterned substrate 501 with a first recess and a second recess. The first and second recesses include raised walls surrounding a substantially flat central region. A first lens element 502 is disposed on a first surface of the substantially flat central region, and a second lens element 504 is disposed on a second surface of the substantially flat central region. In other words, the first lens element 502 and the second lens element 504 are disposed in the recesses formed from the opposite surfaces of the first patterned substrate 501, respectively. An antireflection (AR) layer 514 may be disposed on the first lens element 502, and a black yard coating layer 512 may be disposed on the second lens element 504. The second lens assembly 500a' includes a second patterned substrate 503 with a third recess and a fourth recess. The third and the fourth recesses include raised walls surrounding a substantially flat central region. A third lens element 506 is disposed on a first surface of the third recess which includes a substantially flat central region, and a fourth lens element 508 is disposed on a second surface of the fourth recess which includes the substantially flat central region. In other words, the third lens element 506 and the fourth lens element 508 are disposed in the recesses formed from opposite surfaces of the second patterned substrate 503, respectively. An antireflection (AR) layer 516 is disposed on the fourth lens element 508. In one embodiment, all lens elements align along a same optical axis. For example, lens elements 504, 506, and 508 align along the optical axis through the first lens element 502.

Figure 11B:
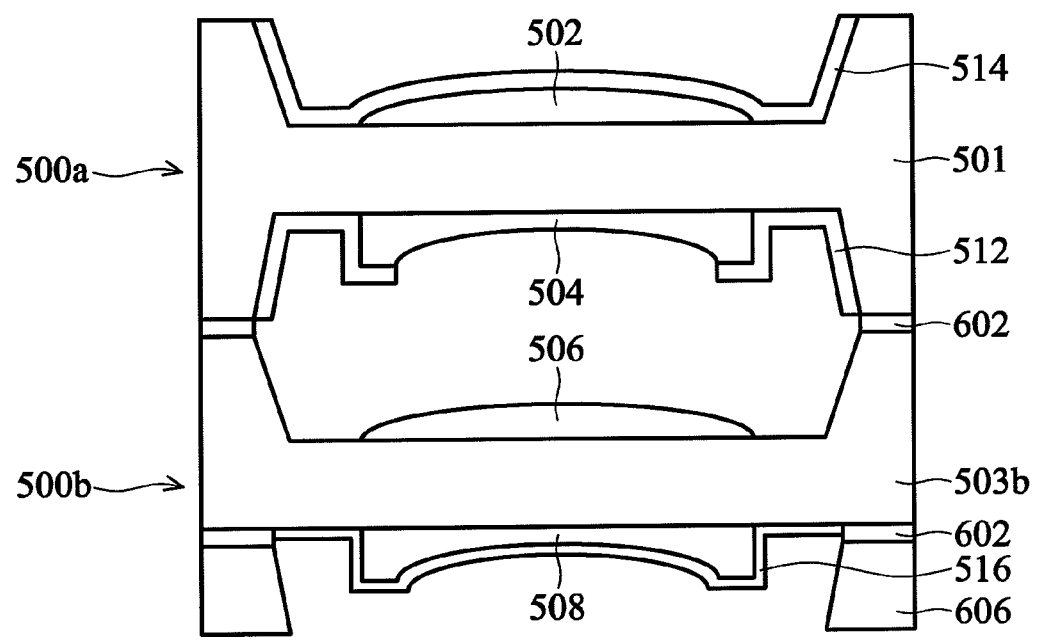
Figure 11C:
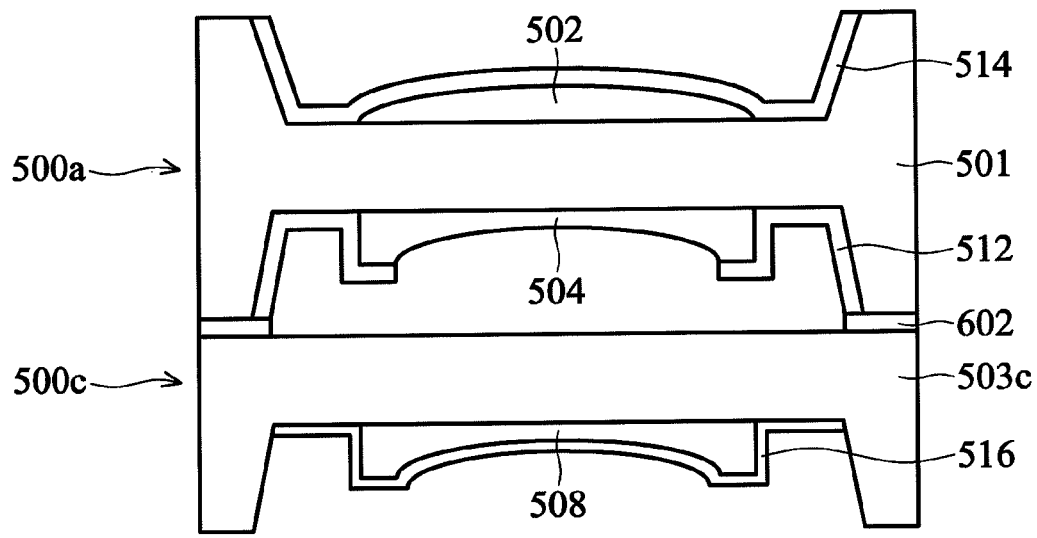
Figure 11D:
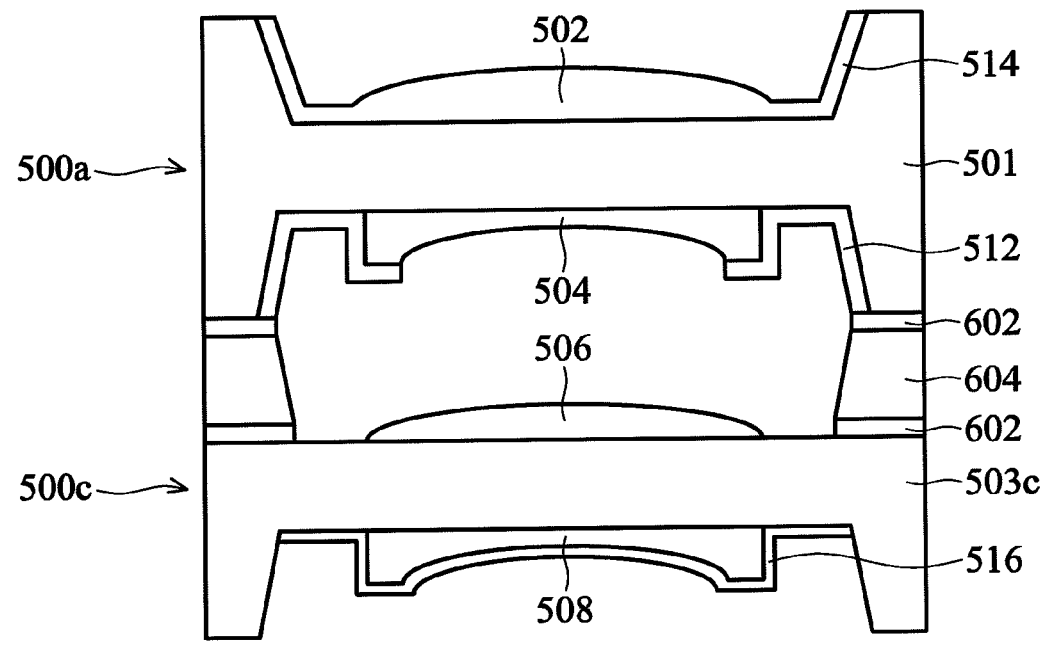
Figure 11E:
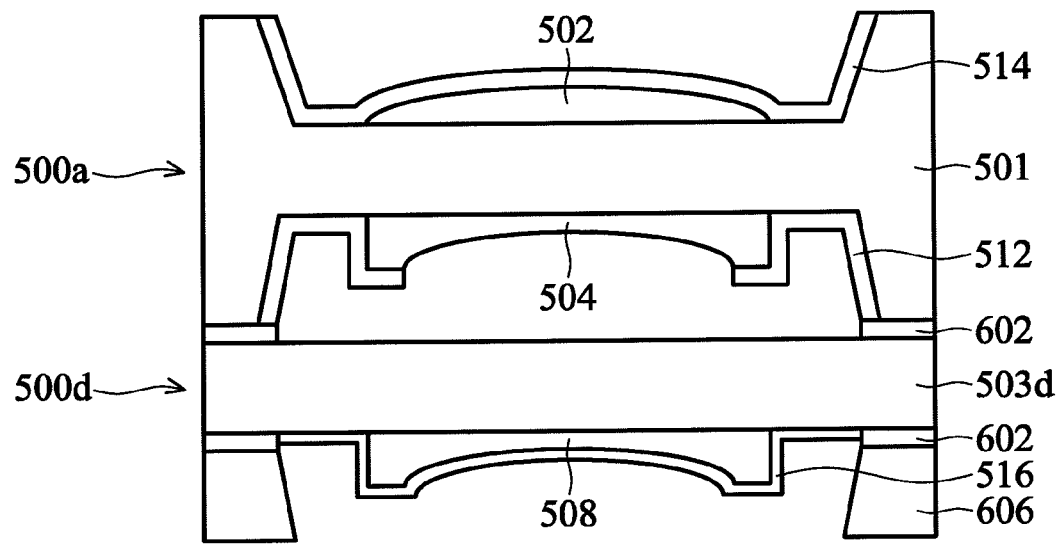
Figure 11F:
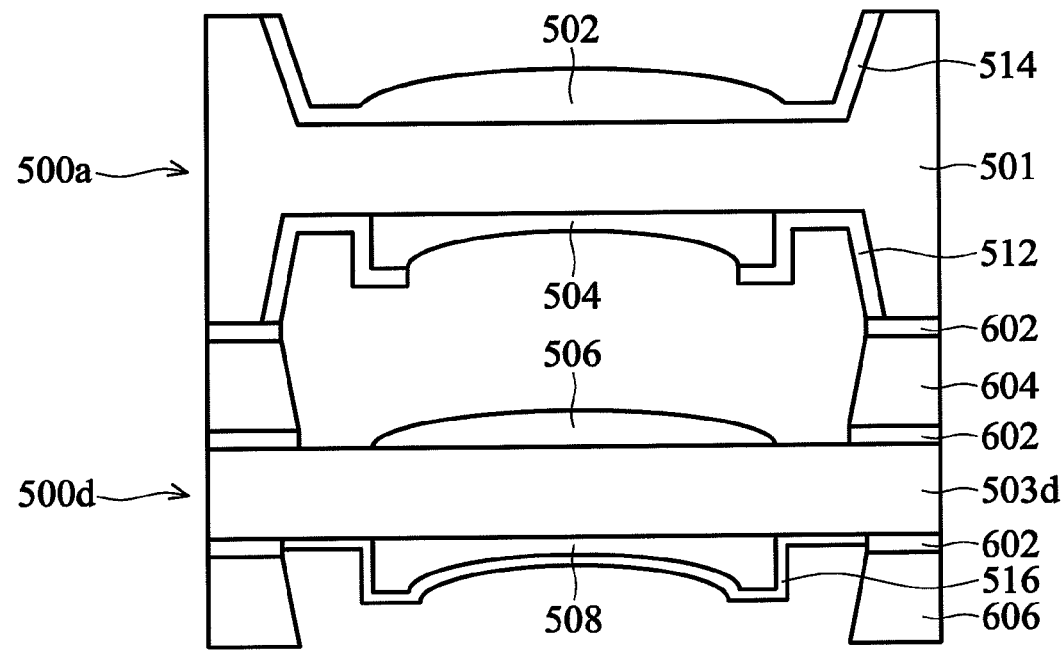
Figure 11G:
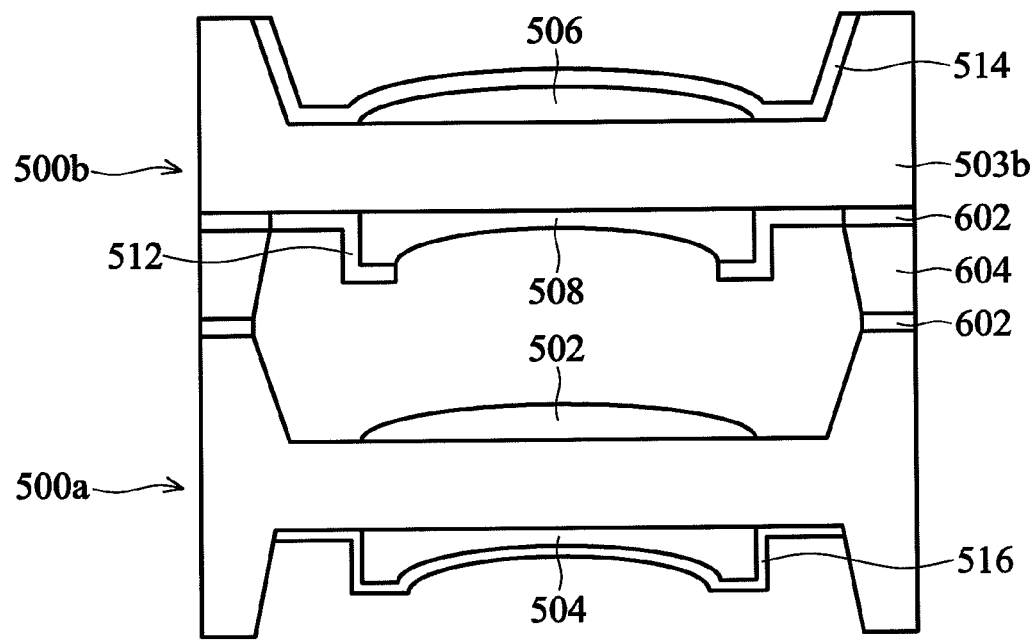
Figure 11H:
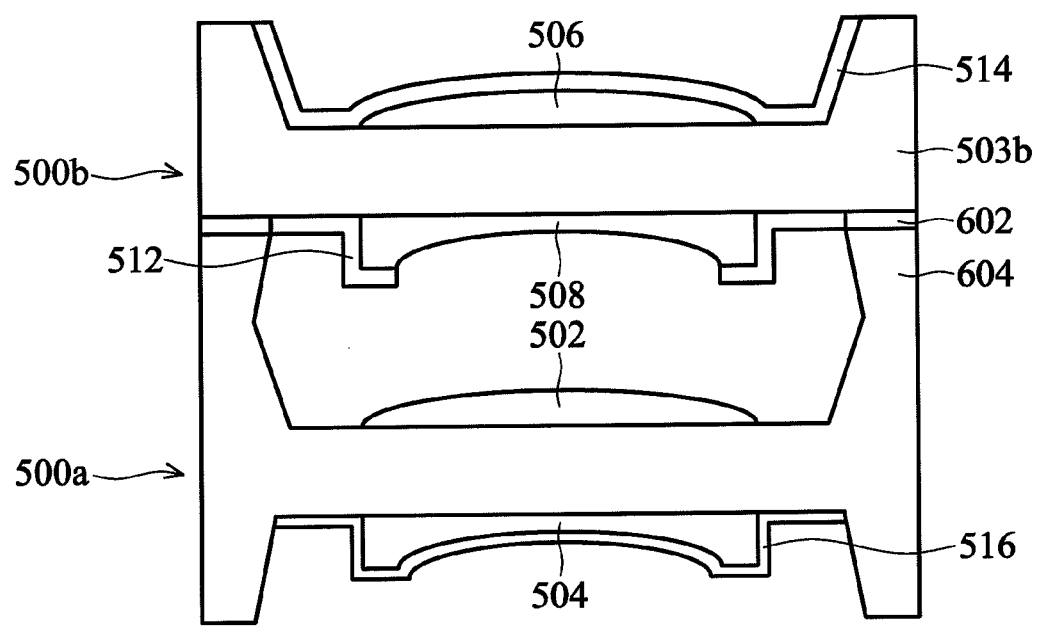
Figure 11I:
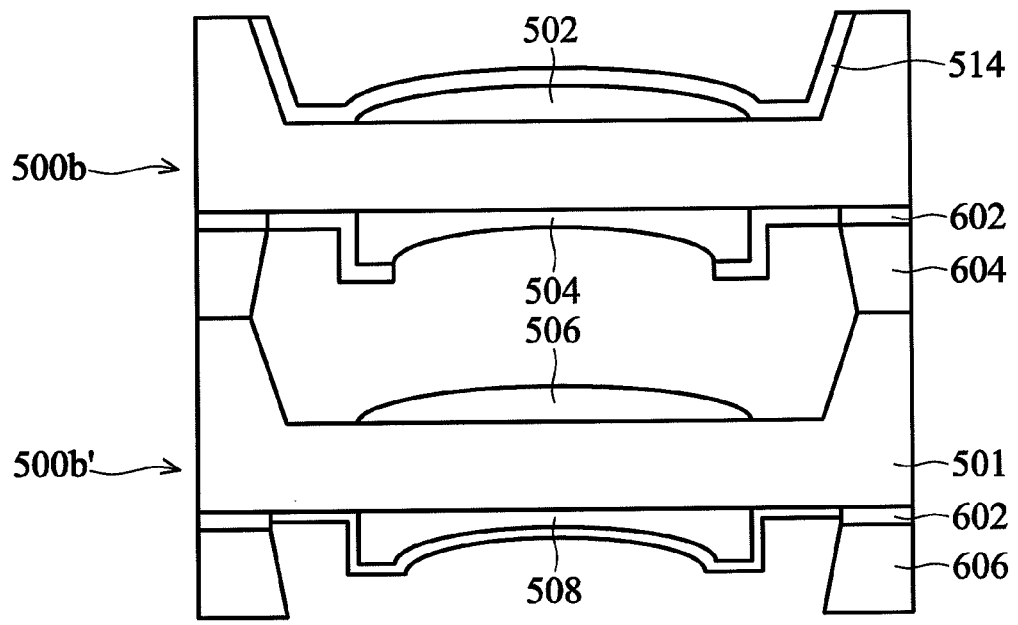
Figure 11J:
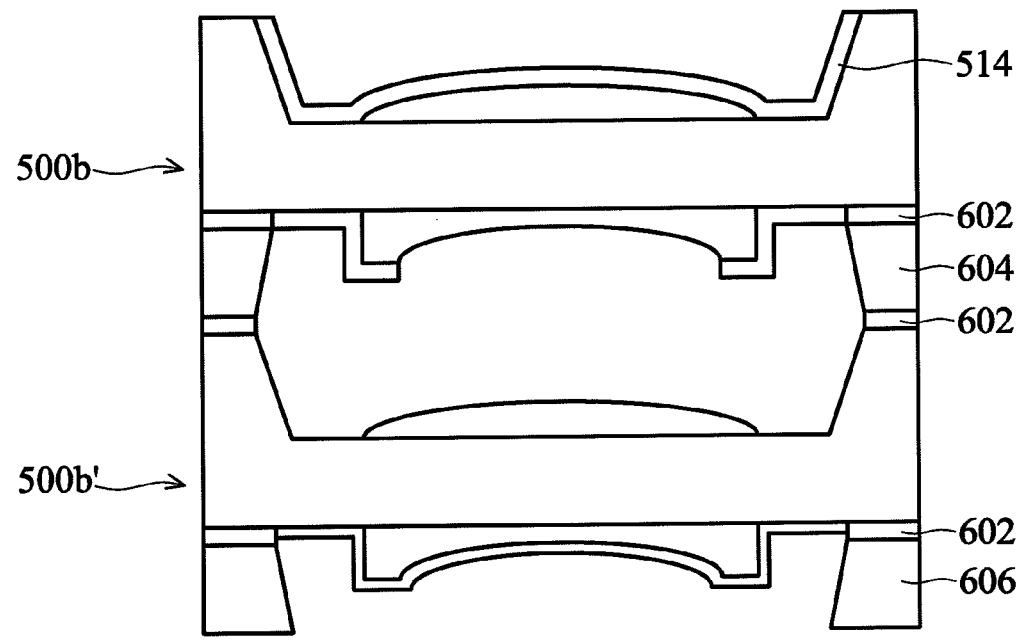
Figure 11K:
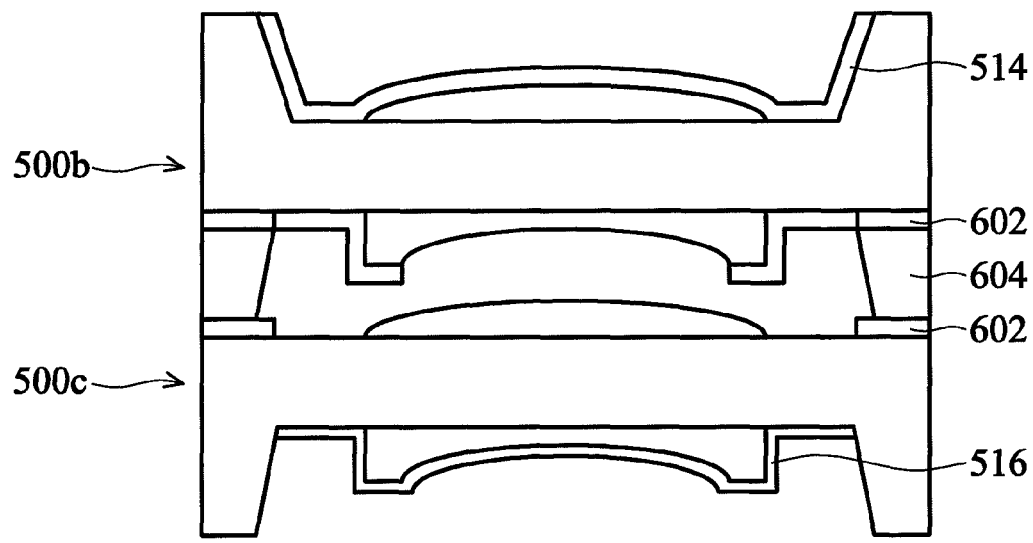
Figure 11L:
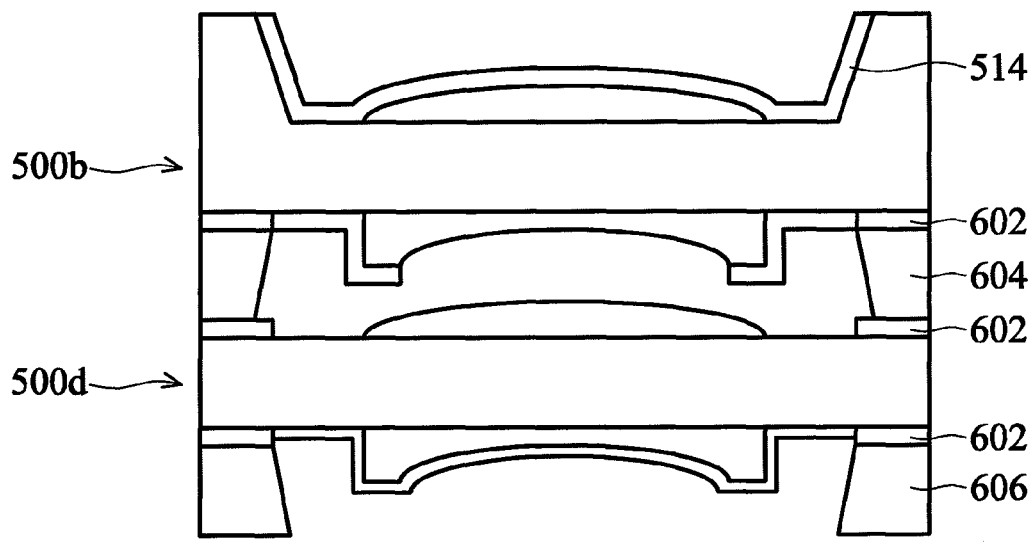
Figure 11M:
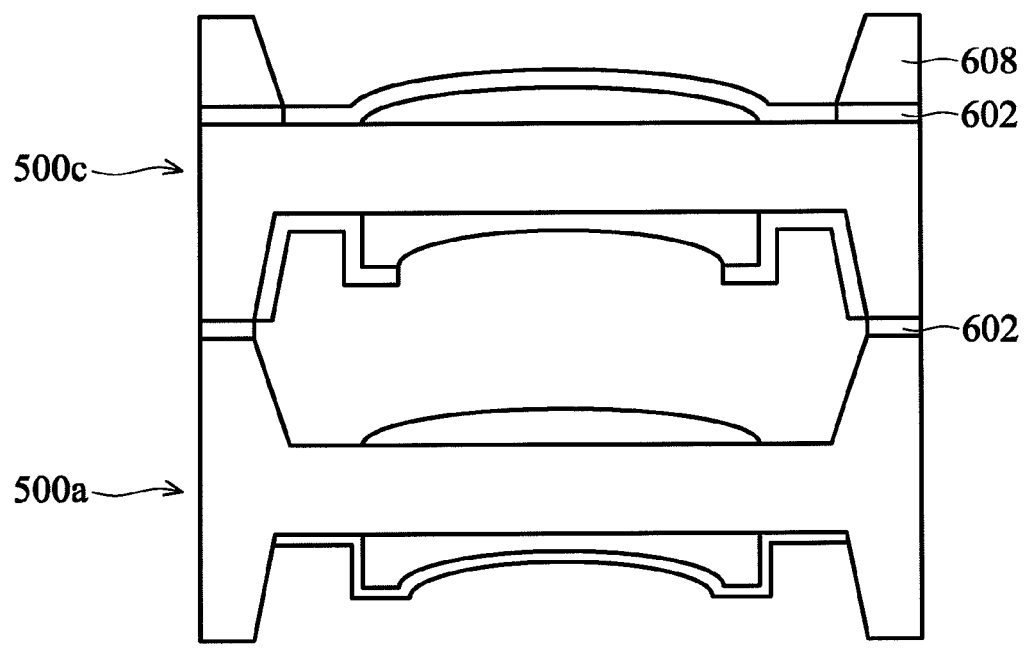
Figure 11N:
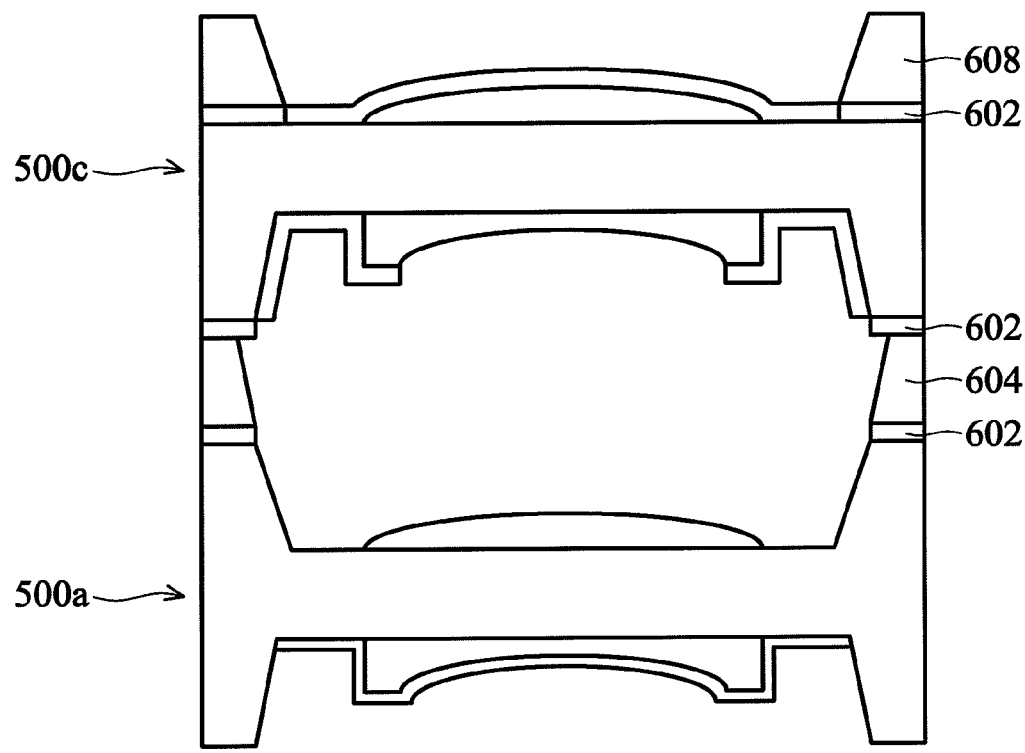
Figure 11O:
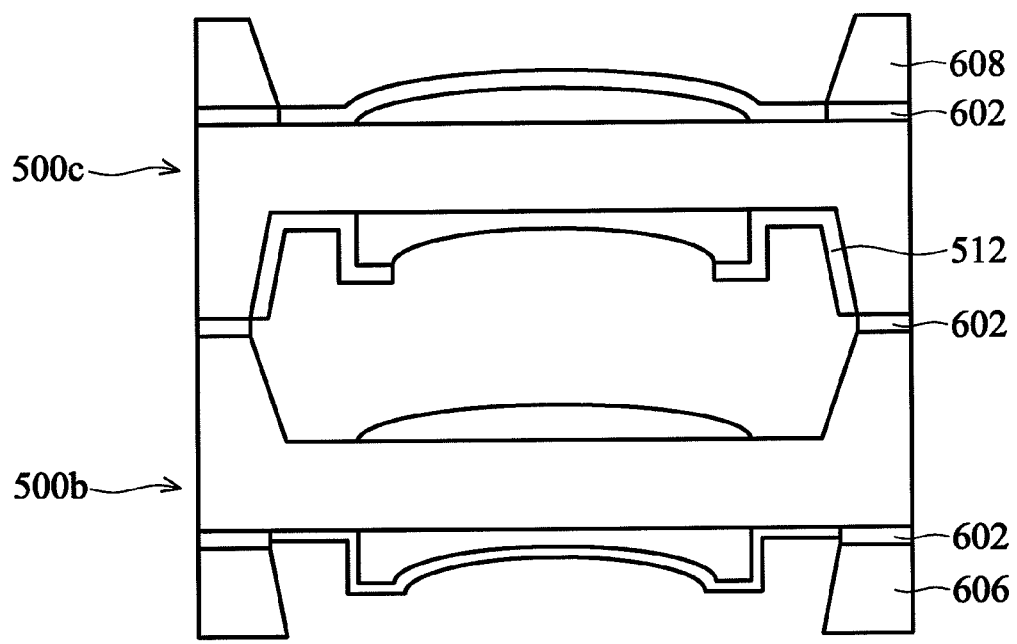
Figure 11P:
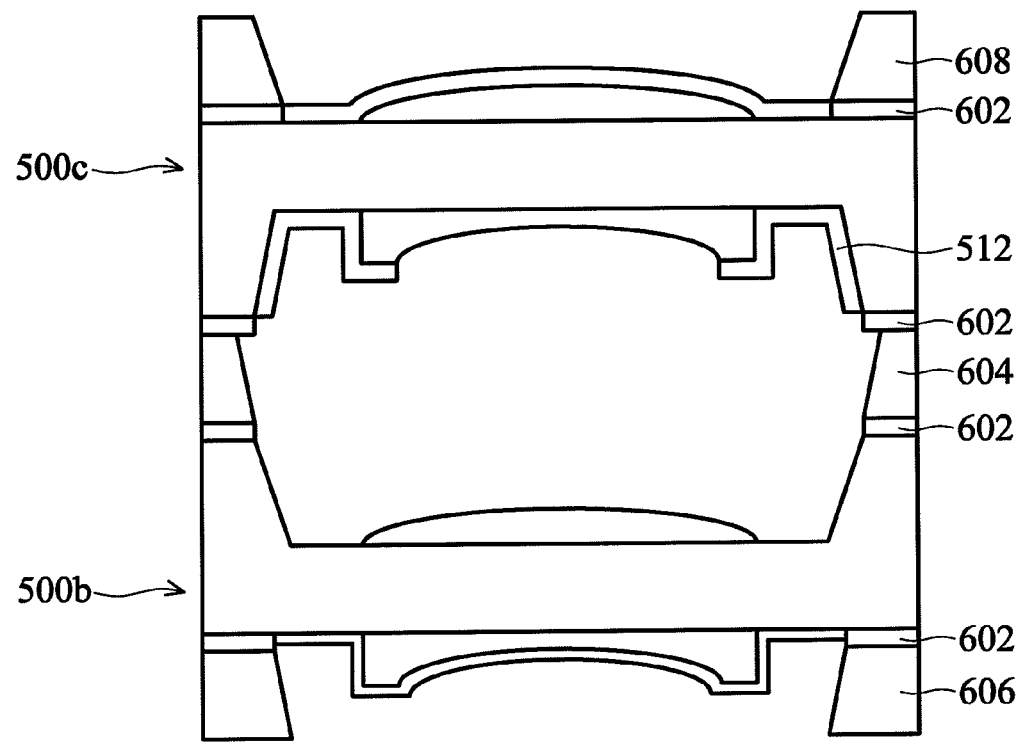
Figure 11Q:
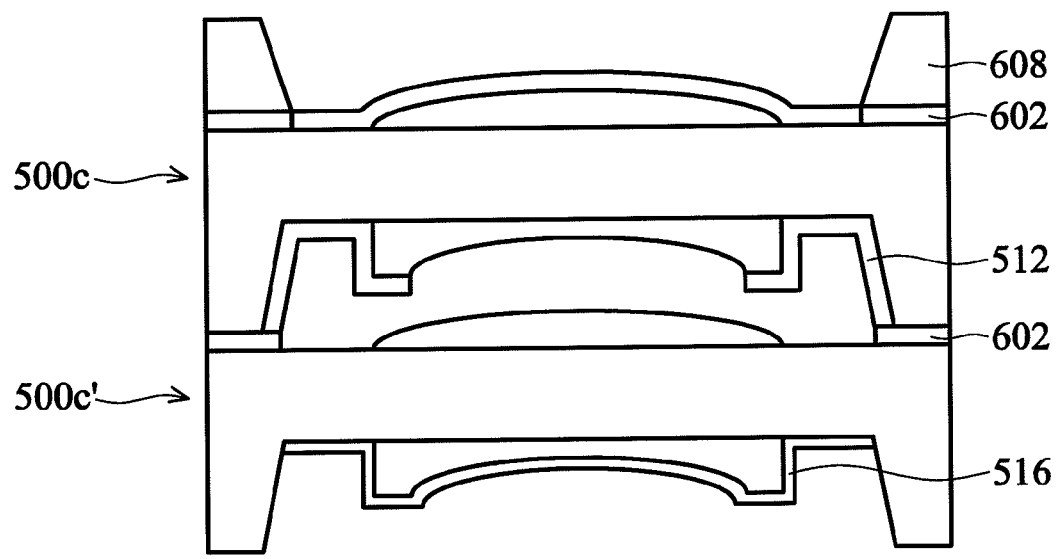
Figure 11R:
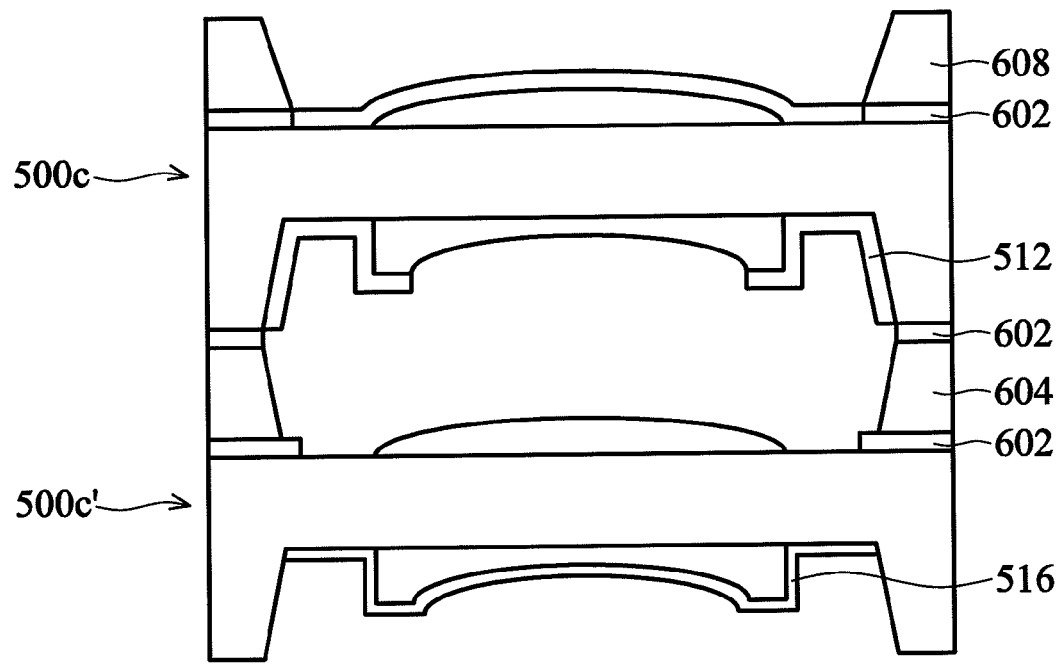
Figure 11S:
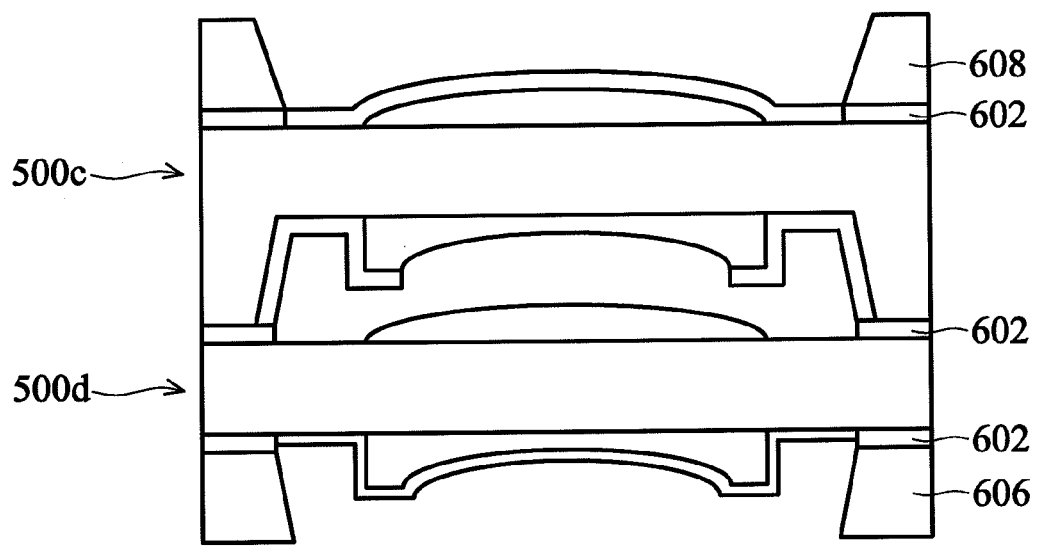
Figure 11T:
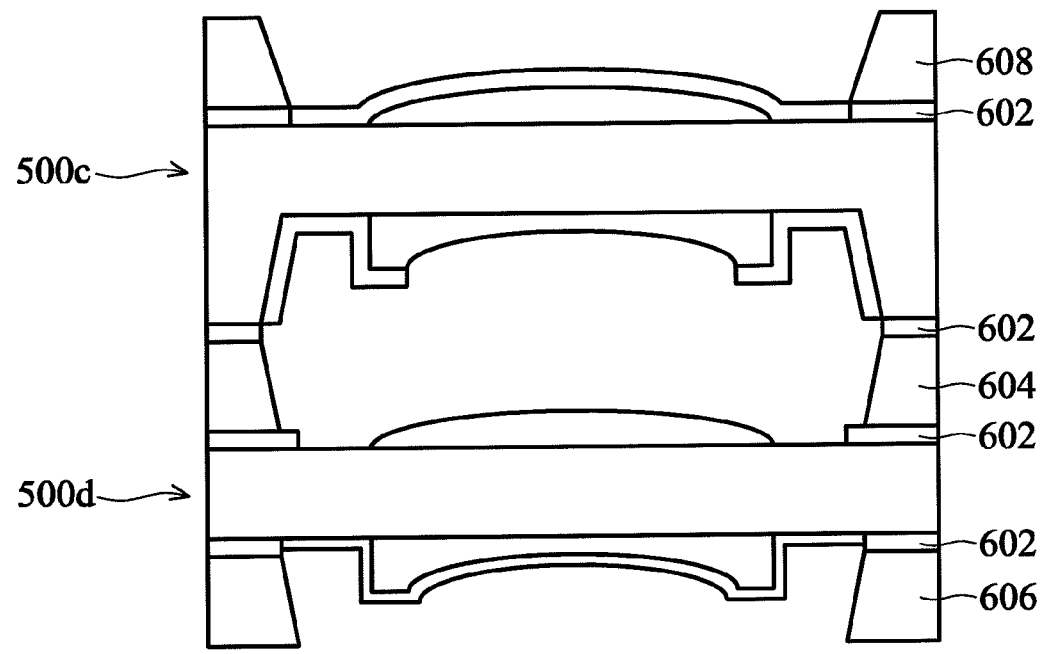
Figure 11U:
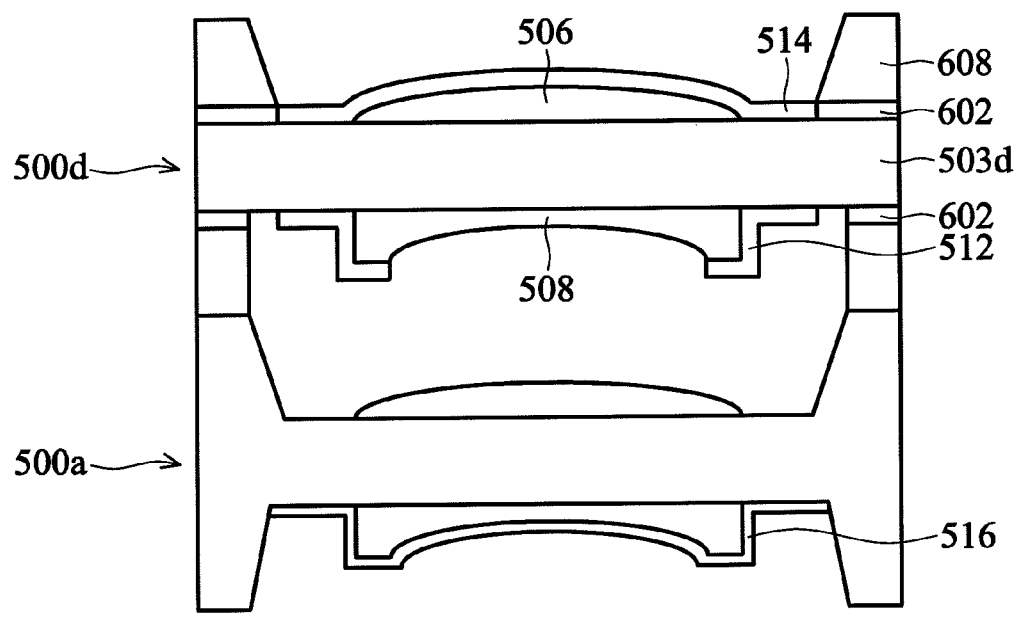
Figure 11V:
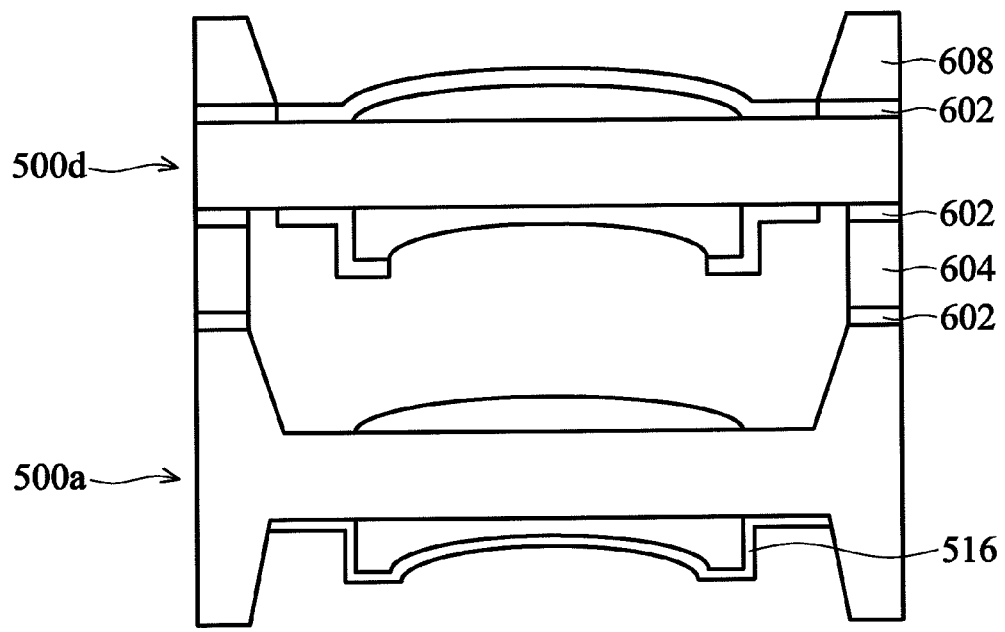
Figure 11W:
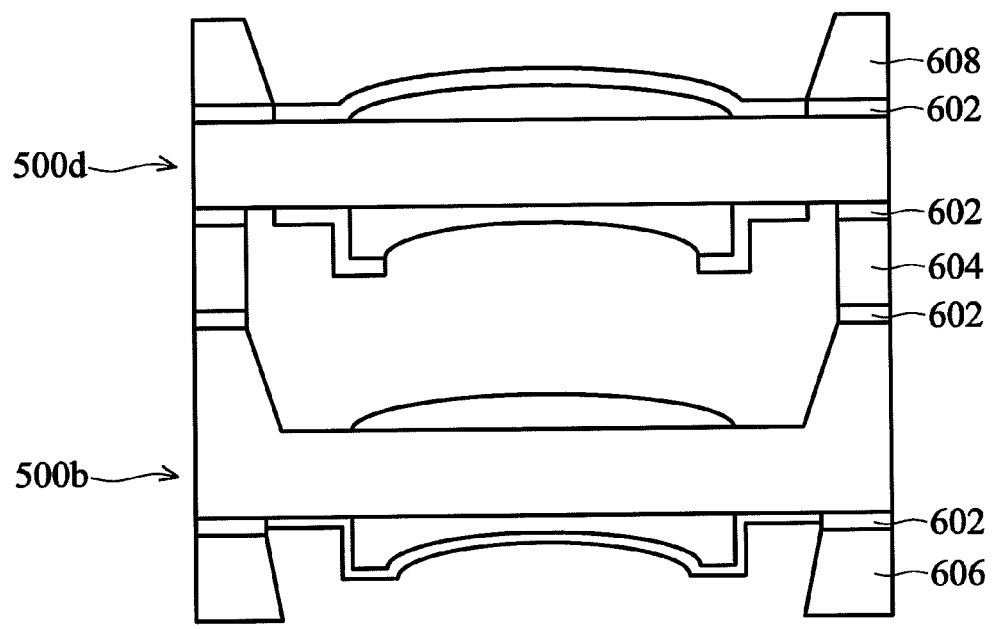
Figure 11X:
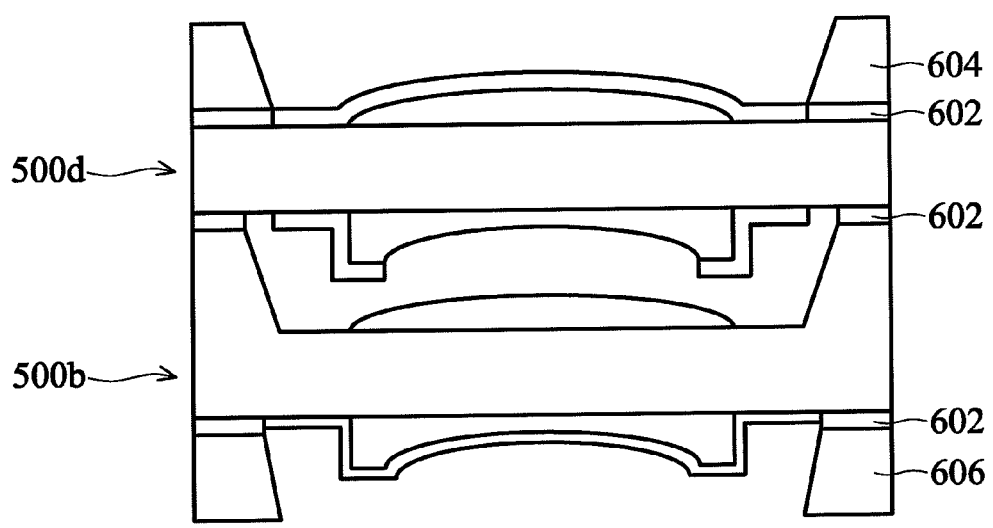
Figure 11Y:
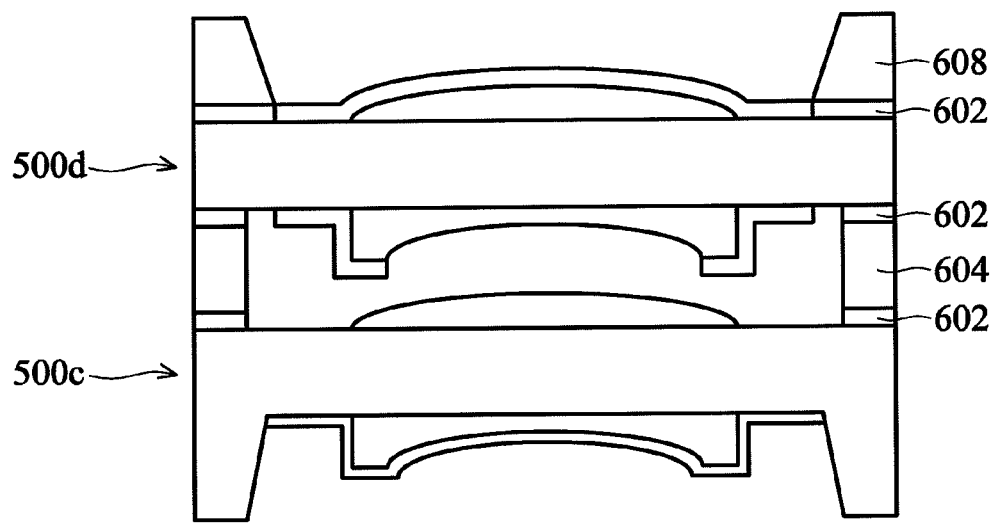
Figure 11Z:
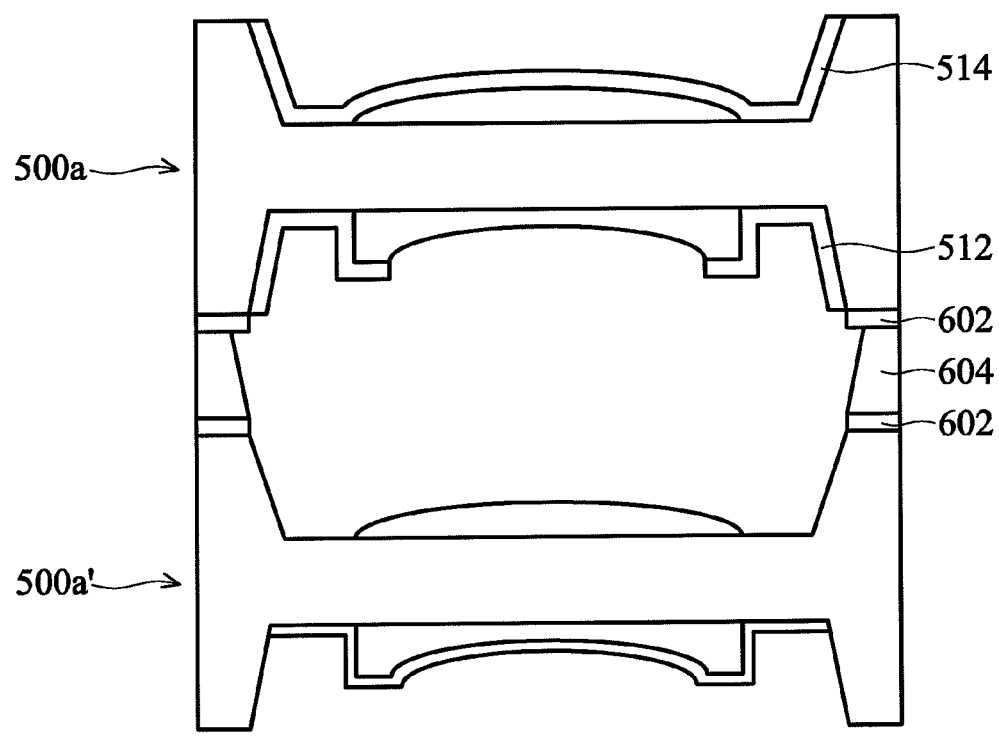
Figure 11A:
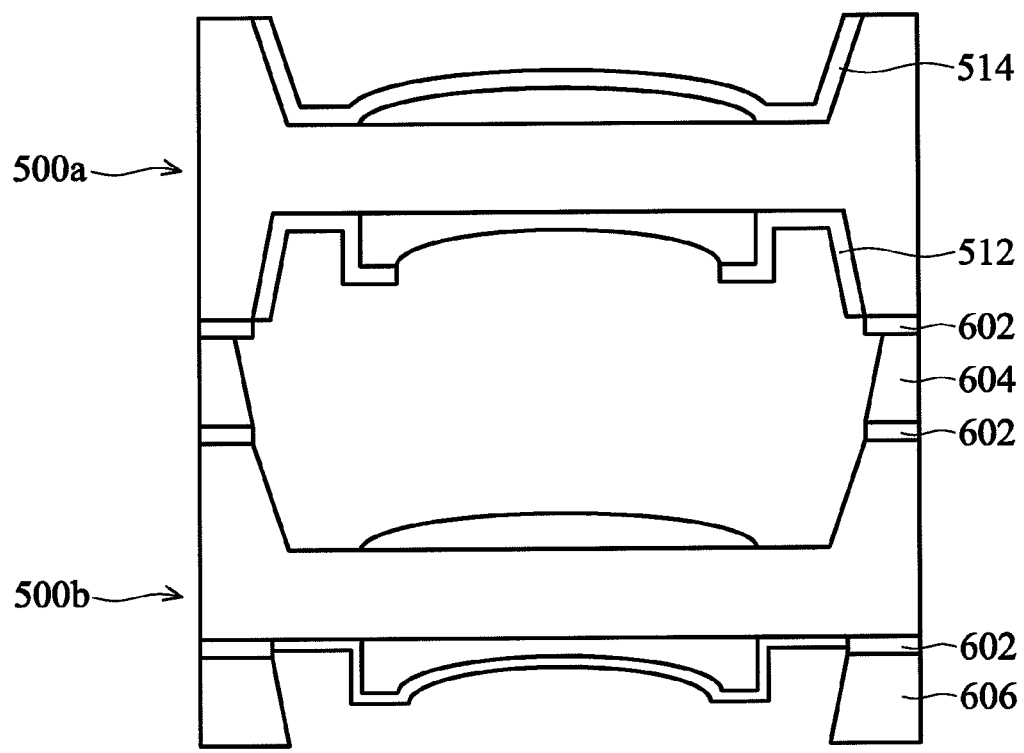

In another embodiment, the stacked lens module of FIG. 11A may further include a spacer 604 interposed between the first lens assembly 500a and the second lens assembly 500a', as shown in FIG. 11Z.

Referring to FIG. 11B, a second lens assembly 500b is aligned with and stacked underlying a first lens assembly 500a, wherein an adhesion layer 602 is interposed between the first lens assembly 500a and the second lens assembly 500b. In one embodiment, the second lens assembly 500b includes a second patterned substrate 503b with a third recess formed from a top surface (or a third side) of the second patterned substrate 503b which includes upward raised walls surrounding a substantially flat central region. A third lens element 506 is disposed on a first surface (or a bottom surface) of the third recess, and a fourth lens element 508 is disposed on a back surface (or a fourth side) of the second patterned substrate opposing the third recess. A second antireflection layer 516 is disposed on the fourth lens element 508. A first spacer 606 is disposed on the second surface of the second patterned substrate 503b surrounding the fourth lens element 508. In another embodiment, the stacked lens module of FIG. 11B can further include a second spacer 604 interposed between the first lens assembly 500a and the second lens assembly 500b, as shown in FIG. 11AA.

Referring to FIG. 11C, a second lens assembly 500c is aligned with and stacked underlying a first lens assembly 500a, wherein an adhesion layer 602 is interposed between the first lens assembly 500a and the second lens assembly 500c. In one embodiment, the second lens assembly 500c includes a second patterned substrate 503c with a fourth recess formed from a bottom surface of the second patterned substrate 500c which includes downward raised walls surrounding a substantially flat central region. A lens element 508 is disposed on a second surface of the substantially flat central region of the fourth recess. A second antireflection layer 516 is disposed on the lens element 508. In another embodiment, the stacked lens module of FIG. 11C can further include a spacer 604 interposed between the first lens assembly 500a and the second lens assembly 500c, as shown in FIG.

11D. A lens element 506 is disposed on a second surface of the second patterned substrate opposing the fourth recess.

Referring to FIG. 11E, a second lens assembly 500*d* is aligned with and stacked underlying a first lens assembly 500*a*, wherein an adhesion layer 602 is interposed between the first lens assembly 500*a* and the second lens assembly 500*d*. In one embodiment, the second lens assembly 500*d* includes a plano-plano substrate 503*d*. A lens element 508 is disposed on a second surface (or a second side) of the plano-plano substrate 503*d*. A second antireflection layer 516 is disposed on the lens element 508. A first spacer 606 is disposed on the back of the plano-plano substrate 503*d* surrounding the lens element 508. In another embodiment, the stacked lens module of FIG. 11E can further include a second spacer 604 interposed between the first lens assembly 500*a* and the second lens assembly 500*d*, as shown in FIG. 11F.

Referring to FIG. 11H, a second lens assembly 500*b* is aligned with and stacked on a first lens assembly 500*a*, wherein a second layer 602 is interposed between the first lens assembly 500*a* and the second lens assembly 500*b*. In one embodiment, the second lens assembly 500*b* includes a second patterned substrate 503*b* with a third recess formed from a top surface of the second patterned substrate 503*b* which includes upward raised walls surrounding a substantially flat central region. A third lens element 506 is disposed on a first surface of the substantially flat central region of the third recess, and a fourth lens element 508 is disposed on a second surface of the second patterned substrate opposing the third recess. A black yard coating layer 512 is disposed on the fourth lens element 508, and an antireflection layer 516 is disposed on the third lens element 506. In another embodiment, the stacked lens module of FIG. 11G can further include a spacer 604 interposed between the first lens assembly 500*a* and the second lens assembly 500*b*, as shown in FIG. 11H.

Referring to FIG. 11M, a second lens assembly 500*c* is aligned with and stacked on a first lens assembly 500*a*, wherein an adhesion layer 602 is interposed between the first lens assembly 500*a* and the second lens assembly 500*c*. In one embodiment, the second lens assembly 500*c* includes a second patterned substrate with a fourth recess from a bottom surface of the second patterned substrate which includes downward raised walls surrounding a substantially flat central region. A third lens element is disposed on the first surface of the second patterned substrate opposing the fourth recess, and a fourth lens element is disposed on the second surface of the fourth recess. An antireflection layer is disposed on the third lens element, and a black yard coating layer is disposed on the fourth lens element. A first spacer 608 is disposed on the first surface of the second patterned substrate surrounding the third lens element. In another embodiment, the stacked lens module of FIG. 11M may further include a second spacer 604 interposed between the first lens assembly 500*a* and the second lens assembly 500*c*, as shown in FIG. 11N.

Referring to FIG. 11U, a second lens assembly 500*d* is aligned with and stacked on a first lens assembly 500*a*, wherein an adhesion layer 602 is interposed between the first lens assembly 500*a* and the second lens assembly 500*d*. In one embodiment, the second lens assembly 500*d* includes a plano-plano substrate 503*d*. A third lens element 506 is disposed on a first surface of the plano-plano substrate 503*d*, and a fourth lens element 508 is disposed on a second surface of the plano-plano substrate 503*d*. An antireflection layer 514 is disposed on the third lens element 506, and a black yard coating layer 512 is disposed on the fourth lens element 508. A first spacer 608 is disposed on the front of the plano-plano substrate 503*d* surrounding the third lens element. In another embodiment, the stacked lens module of FIG. 11U can further include a second spacer 604 interposed between the first lens assembly 500*a* and the second lens assembly 500*d*, as shown in FIG. 11V.

Referring to FIG. 11I, a second lens assembly 500*b*' is aligned with and stacked underlying a first lens assembly 500*b*, wherein an adhesion layer 602 is interposed between the first lens assembly 500*b* and the second lens assembly 500*b*'. In one embodiment, the first lens assembly 500*b* includes a first patterned substrate with a first recess formed from a top surface of the first patterned substrate which includes upward raised walls surrounding a substantially flat central region. A first lens element 502 is disposed on a first surface of the first recess, and a second lens element 504 is disposed on a second surface of the first patterned substrate opposing the first recess. An antireflection (AR) layer may be disposed on the first lens element, and a black yard coating layer is disposed on the second lens element. The second lens assembly 500*b*' includes a second patterned substrate with a third recess formed from a top surface of the second patterned substrate which includes upward raised walls surrounding a substantially flat central region. A third lens element is disposed on a first surface of the third recess of the second patterned substrate, and a fourth lens element is disposed on a second surface of the second patterned substrate opposing the third recess. A second antireflection layer is disposed on the fourth lens element. A first spacer 606 is disposed on the back of the second patterned substrate surrounding the fourth lens element. In another embodiment, the stacked lens module of FIG. 11I can further include a second spacer 604 interposed between the first lens assembly 500*b* and the second lens assembly 500*b*', as shown in FIG. 11J.

Referring to FIG. 11K, a second lens assembly 500*c* is aligned with and stacked underlying a first lens assembly 500*b*, wherein an adhesion layer 602 is interposed between the first lens assembly 500*b* and the second lens assembly 500*c*. In one embodiment, the second lens assembly 500*c* includes a second patterned substrate with a fourth recess formed from a bottom surface of the second patterned substrate which includes downward raised walls surrounding a substantially flat central region. A third lens element is disposed on the first of the second patterned substrate opposing the fourth recess, and a fourth lens element is disposed in the fourth recess of the second patterned substrate. A second antireflection layer is disposed on the fourth lens element. A spacer 604 may be interposed between the first lens assembly 500*a* and the second lens assembly 500*c*.

Referring to FIG. 11L, a second lens assembly 500*d* is aligned with and stacked underlying a first lens assembly 500*b*, wherein an adhesion layer 602 is interposed between the first lens assembly 500*b* and the second lens assembly 500*d*. In one embodiment, the second lens assembly 500*d* includes a plano-plano substrate. A third lens element is disposed on a first surface of the plano-plano substrate, and a four lens element is disposed on a second surface of the plano-plano substrate. A second antireflection layer is disposed on the fourth lens element. A first spacer 606 is disposed on the back of the plano-plano substrate 503*d* surrounding the fourth lens element 508. A second spacer 604 is interposed between the first lens assembly 500*a* and the second lens assembly 500*d*.

Referring to FIG. 11O, a second lens assembly 500*b* is aligned with and stacked underlying a first lens assembly 500*c*, wherein an adhesion layer 602 is interposed between the first lens assembly 500*c* and the second lens assembly 500*b*. In one embodiment, the first lens assembly 500*c* includes a first patterned substrate with a second recess formed from a bottom surface of the first patterned substrate which includes downward raised walls surrounding a substantially flat central region. A first lens element is disposed on a first surface of the first patterned substrate opposing the second recess, and a second lens element is disposed on a second surface of the second recess. An antireflection (AR) layer may be disposed on the first lens element, and a black yard coating layer is disposed on the second lens element. The second lens assembly 500b includes a second patterned substrate with a third recess formed from a top surface of the second patterned substrate which includes upward raised walls surrounding a substantially flat central region. A third lens element is disposed in the third recess of the second patterned substrate, and a fourth lens element is disposed on a second surface of the second patterned substrate opposing the third recess. A second antireflection layer is disposed on the fourth lens element. A first spacer 608 is disposed on the front of the first patterned substrate surrounding the first lens element. A second spacer 606 is disposed on the back of the second patterned substrate surrounding the fourth lens element. In another embodiment, the stacked lens module of FIG. 11O can further include a third spacer 604 interposed between the first lens assembly 500c and the second lens assembly 500b, as shown in FIG. 11P.

Referring to FIG. 11X, a second lens assembly 500d is aligned with and stacked on a first lens assembly 500b, wherein an adhesion layer 602 is interposed between the first lens assembly 500b and the second lens assembly 500d. In one embodiment, the second lens assembly 500d includes a plano-plano substrate. A third lens element is disposed on a first surface of the plano-plano substrate, and a fourth lens element is disposed on a second surface of the plano-plano substrate. An antireflection layer is disposed on the third lens element, and a black yard coating layer is disposed on the fourth lens element. A first spacer 608 is disposed on the front of the plano-plano substrate surrounding the third lens element. A second spacer 606 is disposed on the back of the first patterned substrate surrounding the second lens element. In another embodiment, the stacked lens module of FIG. 11X can further include a third spacer 604 interposed between the first lens assembly 500b and the second lens assembly 500d, as shown in FIG. 11W.

Referring to FIG. 11Q, a second lens assembly 500c' is aligned with and stacked underlying a first lens assembly 500c, wherein an adhesion layer 602 is interposed between the first lens assembly 500c and the second lens assembly 500c'. In one embodiment, the second lens assembly 500c' includes a second patterned substrate with a fourth recess formed from a bottom surface of the second patterned substrate which includes downward raised walls surrounding a substantially flat central region. A third lens element is disposed on the first surface of the second patterned substrate opposing the fourth recess, and a fourth lens element is disposed in the fourth recess. A second antireflection layer is disposed on the fourth lens element. A first spacer 608 is disposed on the front of the first patterned substrate surrounding the first lens element. In another embodiment, the stacked lens module of FIG. 11Q can further include a second spacer 604 interposed between the first lens assembly 500c and the second lens assembly 500c', as shown in FIG. 11R.

Referring to FIG. 11S, a second lens assembly 500d is aligned with and stacked underlying a first lens assembly 500c, wherein an adhesion layer 602 is interposed between the first lens assembly 500c and the second lens assembly 500d. In one embodiment, the second lens assembly 500d includes a plano-plano substrate. A third lens element is disposed on a first surface of the plano-plano substrate, and a four lens element is disposed on a second surface of the plano-plano substrate. A second antireflection layer is disposed on the fourth lens element. A first spacer 608 is disposed on the front of the first patterned substrate surrounding the first lens element. A second spacer 606 is disposed on the back of the plano-plano substrate surrounding the fourth lens element. In another embodiment, the stacked lens module of FIG. 11S can further include a third spacer 604 interposed between the first lens assembly 500c and the second lens assembly 500d, as shown in FIG. 11T.

Referring to FIG. 11Y, a second lens assembly 500d is aligned with and stacked on a first lens assembly 500c, wherein an adhesion layer 602 is interposed between the first lens assembly 500c and the second lens assembly 500d. In one embodiment, the second lens assembly 500d includes a plano-plano substrate. A third lens element is disposed on a first surface of the plano-plano substrate, and a fourth lens element is disposed on a second surface of the plano-plano substrate. An antireflection layer is disposed on the third lens element, and a black yard coating layer is disposed on the fourth lens element. A first spacer 608 is disposed on the front of the plano-plano substrate surrounding the third lens element. A second spacer 604 is interposed between the first lens assembly 500c and the second lens assembly 500d.

In all embodiments mentioned above, lens elements may all or at least partially align along a same optical axis.

While the invention has been described by way of example and in terms of exemplary embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens module, comprising:
a first lens assembly, comprising
a first patterned substrate, wherein a thickness of the first patterned substrate is less than 300 μm;
a first recess formed from a first surface of the first patterned substrate;
a first lens element disposed in the first recess; and
a second lens element disposed on the first patterned substrate, wherein the second lens element aligns along an optical axis through the first lens element.

2. The lens module according to claim 1, further comprising a coating layer disposed on the second lens element.

3. The lens module according to claim 2, wherein the coating layer comprises a black yard coating layer or an antireflection layer.

4. The lens module according to claim 1, further comprising a second recess formed from a second surface of the first patterned substrate, wherein the second lens element is disposed in the second recess.

5. The lens module according to claim 1, wherein the first lens element is a convex lens, and wherein the second lens element is a concave lens disposed on a second surface of the first patterned substrate.

6. The lens module according to claim 1, further comprising a second lens assembly aligned with and stacked underlying the first lens assembly, wherein the second lens assembly comprises:
a second patterned substrate;
a third recess formed from a lower surface of the second patterned substrate; and a third lens element is disposed in the third recess, wherein the third lens element aligns along the optical axis through the first lens element.

7. The lens module according to claim 6, further comprising a fourth lens element disposed on the second patterned substrate, wherein the fourth lens element aligns along the optical axis through the first lens element.

8. The lens module according to claim 7, further comprising a fourth recess formed from an upper surface of the second patterned substrate, wherein the fourth lens element is disposed in the fourth recess.

9. The lens module according to claim 7, wherein the fourth lens element is disposed on an upper surface of the second patterned substrate.

10. The lens module according to claim 7, further comprising a second coating layer disposed on the third lens element or the fourth lens element.

11. The lens module according to claim 6, further comprising a spacer interposed between the second lens assembly and the first lens assembly.

12. The lens module according to claim 6, further comprising an adhesion layer interposed between the second lens assembly and the first lens assembly.

13. The lens module according to claim 1, further comprising a second lens assembly aligned with and stacked underlying the first lens assembly, wherein the second lens assembly comprises:
a plano-plano substrate having a first side and a second side;
a third lens element disposed on the first side of the plano-plano substrate, wherein the third lens aligns along the optical axis through the first lens element; and
an adhesion layer interposed between the second lens assembly and the first lens assembly.

14. The lens assembly according to claim 13, further comprising a fourth lens element disposed on the second side of the plano-plano substrate.

15. The lens assembly according to claim 13, further comprising a first spacer disposed on the first side of the plano-plano substrate and surrounding the third lens element.

16. The lens assembly according to claim 14, further comprising a second spacer disposed on the second side of the plano-plano substrate and surrounding the fourth lens element.

17. A method for fabricating a lens module, comprising:
forming a first lens assembly, the forming of the first lens assembly comprising:
providing a first substrate having a first surface and a second surface;
removing a portion of the first substrate from the first surface of the first substrate to form a first recess;
disposing a first lens element in the first recess; and
disposing a second lens element on the first substrate, wherein the second lens element aligns along an optical axis through the first lens element;
forming a second lens assembly, wherein the forming of the second lens assembly comprises:
forming a plano-plano substrate having a first side and a second side; and
forming a third lens element on the first side of the plano-plano substrate, wherein the third lens aligns along the optical axis through the first lens element;
disposing the first lens assembly on the second lens assembly; and
forming an adhesion layer between the first lens assembly and the second lens assembly.

18. The method for fabricating a lens module according to claim 17, further comprising removing a portion of the first substrate from the second surface of the first substrate to form a second recess, wherein the second lens element is disposed in the second recess.

19. A lens module, comprising:
a first lens assembly, comprising:
a first patterned substrate;
a first recess formed from a first surface of the first patterned substrate;
a first lens element disposed in the first recess; and
a second lens element disposed on the first patterned substrate, wherein the second lens element aligns along an optical axis through the first lens element;
a second lens assembly aligned with and stacked underlying the first lens assembly, wherein the second lens assembly comprises:
a plano-plano substrate having a first side and a second side;
a third lens element disposed on the first side of the plano-plano substrate, wherein the third lens aligns along the optical axis through the first lens element; and
an adhesion layer interposed between the second lens assembly and the first lens assembly.

20. A lens module, comprising:
a first lens assembly, comprising:
a first patterned substrate;
a first recess formed from a first surface of the first patterned substrate;
a first lens element disposed in the first recess;
a second lens element disposed on the first patterned substrate, wherein the second lens element aligns along an optical axis through the first lens element; and
a second recess formed from a second surface of the first patterned substrate, wherein the second lens element is disposed in the second recess.

* * * * *